(12) United States Patent
Clowes et al.

(10) Patent No.: US 9,158,177 B2
(45) Date of Patent: Oct. 13, 2015

(54) OPTICAL SYSTEMS

(75) Inventors: John Redvers Clowes, Lymington (GB); Christophe Codemard, Eastleigh (GB); Pascal Dupriez, Leognan (FR)

(73) Assignee: Fianium Ltd., Southampton (GB)

( * ) Notice: Subject to any disclaimer, the term of this patent is extended or adjusted under 35 U.S.C. 154(b) by 0 days.

(21) Appl. No.: 13/988,938

(22) PCT Filed: Nov. 24, 2011

(86) PCT No.: PCT/EP2011/070989
§ 371 (c)(1),
(2), (4) Date: Nov. 1, 2013

(87) PCT Pub. No.: WO2012/069612
PCT Pub. Date: May 31, 2012

(65) Prior Publication Data
US 2014/0050235 A1   Feb. 20, 2014

Related U.S. Application Data

(60) Provisional application No. 61/458,561, filed on Nov. 24, 2010, provisional application No. 61/444,779, filed on Feb. 20, 2011, provisional application No. 61/489,241, filed on May 23, 2011, provisional application No. 61/489,735, filed on May 25, 2011.

(51) Int. Cl.
*H01S 3/30* (2006.01)
*G02F 1/365* (2006.01)
(Continued)

(52) U.S. Cl.
CPC ............. *G02F 1/365* (2013.01); *G02F 1/113* (2013.01); *G02F 1/353* (2013.01); *H01S 3/005* (2013.01);
(Continued)

(58) Field of Classification Search
CPC ..... H01S 3/005; H01S 3/0092; H01S 3/0085; H01S 3/2308; H01S 3/1106; H01S 3/2391; H01S 3/06741; H01S 3/10015; H01S 3/10046; H01S 3/1115; H01S 3/10061; H01S 3/1302; G02F 1/365; G02F 1/113; G02F 1/353; G02F 2201/02

USPC ......... 372/6, 18, 21, 25, 26, 32, 43.01, 50.22; 359/341.1, 238, 340, 349
See application file for complete search history.

(56) References Cited

U.S. PATENT DOCUMENTS

| | | |
|---|---|---|
| 5,438,444 A | 8/1995 | Tayonaka et al. |
| 5,631,769 A | 5/1997 | Wheatley |

(Continued)

FOREIGN PATENT DOCUMENTS

EP     1925975 A1     5/2008

OTHER PUBLICATIONS

Shenping Li et al. "Supercontinuum generation in optical fibers"; Proc. of SPIE vol. 6781; 2007; pp. 678105-1-678105-10.*
(Continued)

*Primary Examiner* — Colleen A Matthews
*Assistant Examiner* — Delma R Forde
(74) *Attorney, Agent, or Firm* — Peter Rainville

(57) ABSTRACT

A supercontinuum optical source comprises a laser source apparatus comprising at least one laser, the laser source apparatus configured for providing first and second signals; a modulator apparatus downstream of at least one laser of the laser source apparatus for modulating at least one of the first and second signals, the modulator apparatus including at least one modulator; a combiner downstream of the modulator apparatus for combining the first and second signals; an amplifier downstream of the combiner for amplifying the first and second signals after combination; a nonlinear element downstream of the amplifier for receiving the first and second signals after amplification, the nonlinear optical element providing spectral broadening responsive to the first signal and wherein the second signal does not substantially contribute to spectral broadening; and an output for outputting spectrally broadened light from the optical supercontinuum source.

18 Claims, 22 Drawing Sheets

(51) Int. Cl.
*H01S 3/00* (2006.01)
*H01S 3/10* (2006.01)
*H01S 3/13* (2006.01)
*H01S 3/23* (2006.01)
*G02F 1/11* (2006.01)
*G02F 1/35* (2006.01)

(52) U.S. Cl.
CPC ............. *H01S 3/0085* (2013.01); *H01S 3/0092* (2013.01); *H01S 3/10015* (2013.01); *H01S 3/1302* (2013.01); *H01S 3/2308* (2013.01); *G02F 2201/02* (2013.01); *H01S 3/10061* (2013.01); *H01S 3/2391* (2013.01)

(56) References Cited

U.S. PATENT DOCUMENTS

| | | | |
|---|---|---|---|
| 5,657,153 | A | 8/1997 | Endriz et al. |
| 7,876,498 | B1 | 1/2011 | Honea et al. |
| 8,125,704 | B2 | 2/2012 | Mielke et al. |
| 8,160,113 | B2 | 4/2012 | Adams et al. |
| 8,717,670 | B2 | 5/2014 | Starodoumov et al. |
| 2007/0216993 | A1* | 9/2007 | Aiso et al. ............... 359/340 |
| 2009/0022189 | A1* | 1/2009 | Okuno ..................... 372/25 |
| 2009/0097512 | A1* | 4/2009 | Clowes et al. ............ 372/21 |
| 2009/0141753 | A1 | 6/2009 | Furuya |
| 2009/0185588 | A1* | 7/2009 | Munroe ..................... 372/22 |
| 2010/0272137 | A1 | 10/2010 | Kopf et al. |
| 2012/0292531 | A1* | 11/2012 | Grudinin et al. ............ 250/459.1 |
| 2013/0107351 | A1* | 5/2013 | Clowes et al. ............. 359/341.3 |
| 2013/0208739 | A1* | 8/2013 | Clowes et al. .............. 372/21 |
| 2013/0250982 | A1* | 9/2013 | Zhang et al. ................ 372/21 |

OTHER PUBLICATIONS

P. H. Pioger et al. "High spectral power density supercotinuum generation in a nonlinear fiber amplifier" Sep. 3, 2007/ vol. 15, No. 18/ Optics Express; pp. 11358-11363.*

B. W. Liu et al. "High-power wavelength-tunable photonic-crystal-fiber-based oscillator-amplifier-frequency-shifter femtosecond laser system and its applications for material micoprocessing" 2009, The laser Physics Letters pp. 44-48.*

Communication pursuant to Article 94(3) EPC and its annex for EP Application No. 11799381.6, Feb 27, 2015.

International Preliminary Report on Patentability of PCT/EP2011/070989, issued Jun. 6, 2013.

International Search Report and Written Opinion of the International Search Authority for PCT/EP2011/070989, issued Jan. 8, 2013.

Communication Relating to the Results of the Partial International Search for PCT/EP2011/070989, issued Jul. 20, 2012.

Fax to EPO regarding International (PCT) Application No. EP2011/070989, May 18, 2012.

Letter to EPO regarding Rule 161/162 communication, EP 11799381.6, Jan. 20, 2014.

Marked up claims submitted with Letter to EPO regarding Rule 161/162 communication, EP 11799381.6, Jan. 20, 2014.

* cited by examiner

OPTICAL SYSTEMS

FIELD OF THE INVENTION

This invention relates to optical systems, such as, for example, laser systems based around a MOPA (Master Oscillator Power Amplifier) architecture wherein the output of a lower power source (e.g., a diode, mode locked laser or other oscillator) is amplified with an amplifier to a higher power. In particular, but not exclusively, it relates to laser MOPA systems incorporating signal discrimination based modulation and external switching.

BACKGROUND TO THE INVENTION

Modulation of the laser beam is desirable in many laser systems. In ultrafast lasers, it is often of interest to have an ability to select individual pulses, burst of pulses, to reduce the pulse repetition rate and to switch on and off the laser beam with extremely short rise and fall times. It can also be desirable to modify the amplitude of a pulse to a selected non-zero value, or to otherwise affect a signal. In CW lasers, it can be of interest to gate the output, for example to turn on and off the laser beam or to add burst mode operation The MOPA is an attractive configuration of laser technology for producing high average output powers. The MOPA is often configured as an all-optical-fiber laser, where a fiber-based oscillator seeds a fiber-based optical amplifier. However, MOPA's are also designed as a fiber-oscillator seeding a solid-state optical amplifier, a solid-state oscillator seeding a solid state amplifier or a solid-state oscillator seeding an optical fiber amplifier. MOPA's can also exist as semiconductor oscillators and amplifiers and combinations with fiber- and solid-state amplifiers.

In a MOPA configuration, it is possible to modulate the pump source of the optical amplifier in order to have some method of switching on and off the beam and/or modulating the power of the amplifier output. Direct modulation of a fiber or solid state amplifier is limited in the switching speed due to carrier lifetimes within the amplifier gain media.

For low pulse repetition rates, the duty cycle of the pulses can be insufficient to saturate the amplifier, resulting in the amplifier producing high noise levels in between pulses. In this situation, the amplifier gain can become too high and unsustainable leading to catastrophic damage typically by self-Q-switching.

SUMMARY

This disclosure provides an optical system comprising an optical apparatus arranged to direct received light to different paths and to provide a first signal and a second signal, said first and second signals having an optical difference therebetween sufficient for distinguishing optical signals. The optical system comprises an amplifier in optical communication with said optical apparatus for amplifying the first and second signals, and a discrimination device. According to embodiments, the discrimination device receives amplified light and provides output light responsive to the optical difference.

The discrimination device may receive light from the amplifier directly, or alternatively indirectly. In use, the discrimination device responds to the optical difference and produces a corresponding output. For example, where the optical difference is polarisation difference, the discrimination device may comprise a device (e.g: a polarizer) which responds to the polarisation difference by splitting the received amplified beam into two beams of differing polarisation, or alternatively by absorbing one polarisation state and passing the other.

The first and signals may be provided at different times. In some examples, the first and second signals are modulated out of phase with one another.

The optical apparatus may be configured to alter the polarization of light passing along one of said paths, thereby to provide first and second signals having a polarization difference therebetween sufficient for distinguishing optical signals. The discrimination device may comprise a polarisation sensitive optical element to provide output light responsive to said polarization difference.

The optical apparatus may be configured to selectively control the relative amount of received light which is directed to said different paths responsive to a control signal.

The optical apparatus may comprise modulation apparatus. The modulation apparatus may for example include a single modulator, or two modulators. Each modulator may comprise an acousto-optic modulation (AOM), or electro-optic modulator (EOM). The modulation apparatus may include two outputs. In embodiments, the modulation apparatus comprises a single modulator, such as an AOM or EOM, having two outputs.

The optical apparatus may comprise a modulation apparatus having first and second outputs, wherein the modulation apparatus is configured to selectively direct received light to said first and second outputs responsive to a control signal, thereby to direct received light to different paths.

The modulation apparatus may comprise an acousto-optic modulator (AOM) having have two outputs, which is configured to selectively control the relative amount of received light which is directed to different orders. One of said orders may be a zero order of the AOM and the other of said orders may be a diffracted order of the AOM.

The optical apparatus may comprise a second acousto-optic modulator in optical communication with said acousto-optic modulator.

The optical apparatus may comprise an electro-optic modulator (EOM).

In embodiments, the optical apparatus may comprise a splitter to split received light into a first path and a second path; a first modulator in optical communication with said first path and a second modulator in optical communication with said second path.

In embodiments, a nonlinear element such as a photonic crystal fiber may be provided downstream of the splitter to generate light nonlinearly by one or more nonlinear processes, e.g: by way of supercontinuum generation, four wave mixing or harmonic generation The first modulator may be an acousto-optic modulator, and the second modulator may be an acousto-optic modulator.

The optical system may further comprise a combiner arranged upstream of the amplifier to combine the first and second signals prior to amplification.

The optical system may comprise first and second outputs. The discrimination device may be configured to direct the first signal to the first output and the second signal to the second output.

The optical system may comprise a nonlinear conversion apparatus arranged to receive the first and second signals and to cause the first and second signals to undergo one or more nonlinear processes to generate nonlinearly generated light.

The nonlinear conversion apparatus may comprise a microstructured optical fiber.

The discrimination device may be configured to pass and/or reflect amplified light responsive to the optical difference, thereby to provide said output light.

The optical system may further comprise an optical output, and the discrimination device may be configured to provide a selected one of said first and second signals to the output.

The discrimination device may comprise a separator.

The optical system may be a laser system.

The optical system may be a master oscillator power amplifier (MOPA) optical apparatus.

The optical apparatus may comprise optical modulation apparatus to provide a first modulated signal and a second signal.

The optical apparatus may be arranged to provide said first signal along one of said paths and said second signal along another of said paths.

The optical apparatus may be configured to change light passing along one of said paths to provide said distinguishable characteristic.

The optical system may comprise an optical source, and said optical apparatus may be arranged to receive light from said optical source. The optical source preferably provides linearly polarised light to the optical apparatus. The optical source may include an oscillator.

The optical system may be a master oscillator power amplifier (MOPA) optical apparatus having enhanced modulation capability at higher optical powers, comprising at least one oscillator. The optical apparatus may comprise optical modulation apparatus in optical communication with said at least one oscillator and comprising at least one modulator, wherein said first signal comprises a modulated optical signal. The discrimination device may comprise an optical beam splitter in optical communication with said optical amplifier for separating amplified optical signals into different optical paths responsive to said optical difference.

This disclosure also provides a method, comprising directing received light to different paths so as to provide a first signal and a second signal, said first and second signals having an optical difference therebetween sufficient for distinguishing optical signals, amplifying the first and second signals, and discriminating between the amplified first and second signals to provide output light responsive to the optical difference.

This disclosure also provides apparatus comprising an optical source apparatus comprising at least one optical source, said optical source apparatus configured for providing first and second signals, a modulation apparatus for modulating at least one of the first and second signals, an amplifier downstream of the modulation apparatus to amplify the first and second signals, and a nonlinear element in optical communication with the modulation apparatus for providing nonlinear generation responsive to the first signal, wherein the nonlinear element is arranged to receive the second signal as well as the first signal. At least part of the second signal, or at least part of any signal generated nonlinearly by the nonlinear element responsive to the second signal, can be removed from an output beam. The output beam may be provided by an output which is in optical communication with the nonlinear element.

The apparatus may comprise an output in optical communication with the nonlinear element for providing the output beam.

The apparatus may include a discrimination device for removing, from said output beam, at least part of the second signal or at least part of any signal generated nonlinearly by the nonlinear element responsive to the second signal. The discrimination device may comprise a separator.

The modulation apparatus may for example include a single modulator, or two modulators. Alternatively, or in addition, modulation apparatus in the form of suitable electronics may be provided to directly modulate an optical source.

The nonlinear element may provide supercontinuum generation responsive to the first signal. Alternatively, or in addition, the nonlinear element may provide four wave mixing, or harmonic generation responsive to the first signal. The nonlinear element may comprise an optical fiber, e.g: a photonic crystal fiber.

The apparatus may further comprise a length of delivery fiber in optical communication with said nonlinear element, said length of delivery fiber having at one end a beam delivery module comprising said output. The beam delivery module may comprise said separator.

The separator may be configured for removing, from the output beam, at least part of the second signal.

In embodiments, the second signal does not substantially contribute to said nonlinear generation.

This disclosure also provides apparatus, comprising an optical source apparatus comprising at least one optical source, said optical source apparatus configured for providing first and second signals, a modulation apparatus for modulating at least one of the first and second signals, an amplifier downstream of the modulation apparatus for amplifying the first and second signals, and a nonlinear element in optical communication with the modulation apparatus for providing nonlinear generation responsive to the first signal. The second signal may not substantially contribute to said nonlinear generation. The apparatus may also comprise an output for outputting nonlinearly generated light. The apparatus may further comprise a discrimination device for removing at least part of the second signal from the output. The discrimination device may comprise a separator.

The apparatus may further comprise a combiner downstream of the modulation apparatus for combining the first and second signals, wherein the amplifier is downstream of the combiner for amplifying the first and second signals after combination.

The apparatus may be a supercontinuum optical source. The nonlinear generation may comprise spectral broadening.

The nonlinear optical element may be in optical communication with and downstream of both the modulation apparatus and the amplifier apparatus.

The modulation apparatus may be configured to modulate the first and second signals. The first signal may be modulated out of sync with the second signal.

The optical source may be configured such that the first and second signals are provided to the amplifier so as to be modulated substantially out of phase with each other.

The first and second signals may comprise the same center wavelength. The first and second signals may have substantially the same polarization state.

The second signal may propagate linearly, or substantially linearly, through the nonlinear element.

The first signal may comprise optical pulses having a first peak power and the second signal may comprise optical pulses having a second peak power, the first peak power being substantially higher than the second peak power.

The first signal may comprise optical pulses having peak power sufficiently high so as to initiate nonlinear generation in the nonlinear element. The second signal may not substantially contribute to said nonlinear generation.

The first signal may comprise optical pulses. The second signal may be a continuous wave (CW) signal.

The modulation apparatus may be downstream of the optical source apparatus.

The amplifier may comprise a fiber amplifier.

This disclosure also provides a method comprising, providing first and second signals, modulating at least one of the first and second signals, amplifying the first and second signals, providing nonlinear generation responsive to the first signal, providing an output beam comprising light generated nonlinearly responsive to the first signal, removing, from the output beam, at least part of the second signal, or at least part of any signal generated nonlinearly by the nonlinear element responsive to the second signal. The second signal may not substantially contribute to said nonlinear generation.

The disclosure also provides a method comprising: providing first and second signals, modulating at least one of the first and second signals, amplifying the first and second signals, and nonlinearly generating output light responsive to the first signal, wherein the second signal does not substantially contribute to said nonlinear generation.

The method may further comprise removing at least part of the second signal from the output.

This disclosure also provides a method of modulating the output of a fiber amplifier at higher output powers for improved performance reliability, comprising providing a modulated optical signal and a second optical signal, delivering the signals together as an input signal to an optical fiber amplifier that amplifies optical signals responsive to receiving a pump signal that creates a population inversion, wherein the modulated optical signal and the second optical signal are delivered so as to propagate along the fiber amplifier such that at least a portion of the fiber amplifier receives the second signal at a time or times when the modulated signal is not present, the second optical signal reducing population inversion in the absence of the modulated optical signal, the modulated optical signal being amplified during propagation along the fiber amplifier, providing an optical output path in optical communication with the optical fiber amplifier and delivering an output signal thereto, the output signal comprising the modulated optical signal after its propagation along the fiber amplifier, and refraining, for at least certain times during the delivery of the modulated optical signal, from delivering the second signal after its propagation along the optical fiber amplifier to the output optical path.

The output signal may substantially comprise an amplification of the modulated optical signal.

The fiber amplifier may comprise an ytterbium doped fiber amplifier.

The output signal may have pulse repetition rate of at least 1 MHz. The output signal may have an average power of at least 1 Watt or a peak power of at least 10 kW. The output signal may comprise an average power of at least 1 Watt or peak power of at least 10 kW.

The pump signal and the modulated optical signal may each comprise a duty cycle and the ratio of the duty cycle of the modulated optical signal to the duty cycle of the pump signal may be no greater than 0.8, no greater than 0.6, or no greater than 0.4, or no greater than 0.2.

The second signal and the pump signal may each comprise a duty cycle, wherein the ratio of the duty cycle of the second signal to the duty cycle of the pump signal is no less than 0.2, or no less than 0.4, or no less than 0.6, or no less than 0.8.

The modulated optical signal and the second signal may be provided such that there is a selected optical difference therebetween. Refraining from delivering the second signal may comprise refraining from delivering the second signal responsive to the optical difference.

The optical difference may comprise the modulated optical signal and the second signal having different states of polarization.

The optical difference may comprise the modulated optical signal and the second signal comprising different wavelengths. The difference between the different wavelengths of the modulated optical signal and the second signal may comprise at least 10 nm.

The modulated optical signal and the second signal may be substantially orthogonally polarized.

The modulated optical signal and the second signal may have different center wavelengths.

The modulated optical signal and the second signal may have different states of polarization. Refraining from delivering the second signal may comprise providing in optical communication with the fiber optical amplifier a polarization sensitive optical element constructed so as to direct light having different polarizations to different optical paths.

The modulated optical signal and the second signal may comprise different wavelengths. Refraining from delivering the second signal may comprise providing in optical communication with the amplifier a wavelength sensitive optical component constructed so as to direct light having different wavelengths to different optical paths.

The second signal may comprise optical pulses. Alternatively, the second signal may comprise a continuous wave signal The pump signal may comprise a continuous wave signal.

Providing the second and modulated optical signals may comprise providing the modulated optical signal and the second optical signal such that they counter propagate within the fiber amplifier.

The method may comprise providing an optical pulse train. Providing at least of one of the modulated optical signal and the second signal may comprise modulating the optical pulse train.

The optical pulse train may be characterized by a first pulse repetition rate (PRR), the modulated optical signal and the second signal have, respectively, second and third PRRs that are each less than the first PRR, and the second signal and modulated signal considered together may propagate along the fiber amplifier as a pulse train having a fourth PRR that is greater than the second and third PRR's but less than or equal to the first PRR.

The method may comprise modulating the optical pulse train, and the optical pulse train may comprise a pulse repetition rate, and the pulse optical signal and the second signal may form a pulse train having a pulse repetition rate that is less than the PRR of the optical pulse train.

Modulating the optical pulse train may comprise providing an optical modulator having an input port and two output ports, one of said output ports providing the modulated optical signal and the other output port providing the second signal.

Modulating the optical pulse train may comprise selecting certain pulses of the optical pulse train for delivery as pulses of the modulated optical signal and other pulses of the optical pulse other than the certain pulses for delivery as the second signal.

This disclosure also provides a method of modulating the output of a fiber amplifier at higher output powers for improved performance reliability, comprising: (a) providing a desired modulation of an output signal, (b) modulating, responsive to (a), an input signal by providing an optical difference between different time parts of the input signal, (c) delivering the modulated input signal to an optical fiber amplifier, (d) separating out time parts from the output signal of the fiber amplifier responsive to the optical difference so as to provide a modulated output signal.

The method may comprise using the output signal in the processing of a material. In some embodiments, the output signal may not comprise an information bearing signal.

This disclosure also provides a method of modulating high power output signals from an optical amplifier, comprising: providing an amplifier, providing a first modulated signal having a first optical property, providing a second signal having second optical property that is different from the first optical property, amplifying both of the first and second signals with the amplifier to provide an amplified signal having both optical properties, providing an optical output in optical communication with, and optically downstream of, the optical amplifier, and amplifying the first and second signals with the amplifier but for at least for certain times refraining from outputting from the output one of the first and second amplified signals such that the output signal comprises signals having one but not the other of the first and second optical properties.

Within the amplifier, the other of the signals may propagate for at least certain locations along the amplifier without overlap with the one signal and may serve to reduce energy storage in the amplifier.

This disclosure also provides a master oscillator power amplifier (MOPA) optical apparatus having enhanced modulation capability at higher optical powers, comprising, at least one oscillator, optical modulation apparatus in optical communication with said at least one oscillator and comprising at least one modulator, said optical apparatus providing first and second optical signals, said first signal comprising a modulated optical signal and said first and second signals having an optical difference therebetween sufficient for distinguishing optical signals, an amplifier in optical communication with said optical apparatus for amplifying the signals; and an optical beam splitter in optical communication with said optical amplifier for separating amplified optical signals into different optical paths responsive to said optical difference.

The optical modulation apparatus may include a second optical modulator in optical communication with said optical modulator and said optical amplifier.

The modulation apparatus may provide said first and second signals as a pulse train with pulses of the first signal interposed between pulses of the said second signal.

The oscillator may provide optical pulses characterized by an oscillator pulse repetition rate, and said pulse train may be characterized by a pulse repetition rate that is less than said oscillator pulse repetition rate.

The oscillator may provide a first pulse train of pulses characterized by an oscillator pulse repetition rate. The pulse train may include consecutive pulses separated by a time period that is greater than the reciprocal of the oscillator pulse repetition rate.

The modulation apparatus may be adapted and constructed to provide said first pulse, wherein the amplitude of the pulse may be modulated to have different non-zero values.

The modulation apparatus may include a second modulator in optical communication with said modulator and a fiber coupled polarization maintaining fiber coupler in optical communication with said first and second modulators.

The optical modulation apparatus may include an optical path along which said first and second modulator are arranged optically in series.

The first and second optical modulators may be optically arranged in parallel. The first modular may modulate said first signal independently of said second signal and said second modulator may modulate said second signal independent of said first signal.

The MOPA apparatus may comprise a non-linear optical element in optical communication with one of said different optical paths for receiving pulses optical signals.

Said optical difference between said first and second signals may comprise said first signal having a first center wavelength and said second signal having a second center wavelength that is different than said first center wavelength.

Said at least one oscillator may comprise a first oscillator providing an output signal having said first center wavelength and a second oscillator providing an output signal having said second center wavelength.

Said at least one modulator may comprise a first modulator in optical communication with said first oscillator for providing said first signal.

Said at least one modulator may comprise a first modulator in optical communication with said first oscillator providing said first signal and a second modulator in optical communication with said second oscillator for providing said second signal.

This disclosure also provides a master oscillator power amplifier (MOPA) optical apparatus having enhanced modulation capability at higher optical powers, comprising, at least one oscillator, optical modulation apparatus in optical communication with said at least one oscillator and comprising at least one modulator, said optical apparatus providing first and second optical signals, said first signal comprising a pulsed optical signal and said first and second signals having an optical difference therebetween sufficient for distinguishing optical signals, an amplifier in optical communication with said optical apparatus for amplifying the signals, and a non-linear optical element in optical communication with said amplifier for generating spectrally broadened optical pulses responsive to receiving optical pulses amplified by said amplifier.

This disclosure also provides a method of generating supercontinuum pulses, comprising providing a first pulsed signal having a first center wavelength, providing a second signal having a second center wavelength that is different than said first center wavelength, amplifying both the first and second signals with an amplifier so as providing first and second amplified signals, providing, optically downstream of the amplifier, a non-linear optical element for generating a supercontinuum responsive to at least one of the first and second signals amplified by the optical amplifier and an output for outputting a supercontinuum signal generated by the non-linear optical element, and wherein for at least certain times the supercontinuum signal output from the output is generated responsive to one but not the other of the first and second amplified signals.

In embodiments, first and second center wavelengths of the first and second signals may differ by at least 1 nm. The first and second center wavelengths may differ by at least 5 nm. The first and second center wavelengths may differ by at least 25 nm.

Providing a first pulsed signal may comprise providing a first source and providing a second signal may comprise providing a second source that is a different source than the first source.

Providing the first and second signals may comprise providing a source that is designed to provide output signals having different center wavelengths.

Amplifying both the first and second signals may comprise amplifying one but not the other of the first and second signals at certain times and amplifying the other of the first and second signals at other times different than the certain times. Amplifying both of first second signals may comprise refraining from amplifying the one of the first and second signals at the other times.

The amplifier may amplify the signals to provide an average optical power of at least 1 Watt, at least 2 Watts, at least 5 Watts, at least 10 Watts, or at least 100 Watts.

The amplifier may amplify the first signals to have a peak pulse power of at least 10 kW, at least 20 kW, at least 35 kW, at least 50 kW or at least 75 kW.

The first signal may have a pulse width of no greater than 250 ns, no greater than 200 ns, no greater than 100 ns, no greater than 20 ns, or no greater than 1 ns. The first signal may have a pulse width of no greater than 250 ps, no greater than 200 ps, no greater than 100 ps, no greater than 20 ps, or no greater than 1 ps.

The second signal may be a substantially continuous wave signal.

This disclosure also provides a method of generating supercontinuum pulses, comprising
providing a first pulsed signal having a first center wavelength;
providing a second signal having a second center wavelength;
amplifying both the first and second signals with an amplifier so as providing first and second amplified signals;
providing, optically downstream of the amplifier, a nonlinear optical element for generating a first supercontinuum responsive to at least one of the first and second signals amplified by the optical amplifier and an output for outputting a supercontinuum signal generated by the non-linear optical element; and
wherein for at least certain times the non-linear optical element receives a signal but does not generate supercontinuum light responsive thereto or for the certain times generates a supercontinuum that is substantially different than the first supercontinuum.

The first and second signals may have respective first and second center wavelengths which are different. Alternatively, the first and second center wavelengths may be substantially the same. The first and second signals may comprise substantially the same polarization.

The first and second signals may be provided to the amplifier so as to be substantially out of phase.

Overlap of one of the first and second signals to the other of the first and second signals along the nonlinear element may, in some embodiments, not be greater than 35%.

The nonlinear optical element may receive and propagate the first and second signals as amplified by the amplifier and may generates the first supercontinuum responsive to one of the signals as amplified and wherein any supercontinuum generated responsive to the other of the optical signals as amplified may be substantially different than the first supercontinuum.

This disclosure also provides a method of generating a supercontinuum signal, comprising: providing a first pulsed signal and a second signal to a nonlinear optical element for generating a supercontinuum signal having selected characteristics responsive to at least one of the first and second signals, and wherein for at least certain times the supercontinuum signal having the selected characteristics is generated responsive to one but not the other of the first and second signals.

The first and second signals may be provided to the non-linear optical element so as to be substantially out of phase.

One of signals may not have sufficient optical power for the nonlinear element to generate a supercontinuum signal responsive thereto.

This disclosure also provides a supercontinuum optical source, comprising: a laser source apparatus comprising at least one laser, said laser source apparatus configured for providing first and second signals; a modulator apparatus downstream of the laser source apparatus for modulating at least one of the first and second signals, an amplifier downstream of the modulator apparatus, said supercontinuum optical source configured such that amplifier amplifies the first and second signals; a nonlinear element in optical communication with and downstream of both the modulator apparatus and the amplifier apparatus for providing selected spectral broadening responsive to the first signal, said supercontinuum optical source configured such that said non linear element receives the second signal as well as the first signal; a length of delivery fiber in optical communication with said nonlinear element, said length of delivery fiber having at one end a beam delivery module for providing an output beam from the supercontinuum optical source; and wherein said beam delivery module comprises a separator for removing at least part of the second signal or at least part of any signal generated nonlinearly by the non-linear element responsive to the second signal from the supercontinuum optical source output beam.

This disclosure also provides a supercontinuum optical source, comprising:
a laser source apparatus comprising at least one laser, said laser source apparatus configured for providing first and second signals;
a modulator apparatus downstream of the laser source apparatus for modulating the first and second signals, said modulator apparatus including at least one modulator;
a combiner downstream of the modulator apparatus for combining the first and second signals,
an amplifier downstream of the combiner for amplifying the first and second signals after combination,
a nonlinear element downstream of the amplifier for receiving the first and second signals after amplification, the nonlinear optical element providing spectral broadening responsive to the first signal and wherein the second signal does not substantially contribute to spectral broadening; and
an output for outputting spectrally broadened light from the optical supercontinuum source.

The supercontinuum optical source may comprise a separator for separating at least part of the second signal from the spectrally broadened light output from the output.

In one aspect, the present invention provides a method of having a MOPA laser system with an extremely large range of selectable modulation rate. The modulation can be achieved without high levels of amplified noise (Amplified Spontaneous Emission) and/or without the need for external modulation. In certain practices, the approach can ensure that the amplifier is seeded at a relatively constant power level, sufficient to prevent Q-switching or excessive ASE development, and/or operates at a relatively constant gain (so constant output peak power) yet enables the combined laser MOPA to deliver variable repetition rate, user selectable from single shot to the fundamental frequency of the oscillator without having to rely on pump power modulation. Note—constant gain and seed level are not obligatory but a satisfactory seed and gain level can usually be maintained to avoid the effects of self-Q-switching and excessive ASE.

Embodiments of the present invention allow the fast automatic selection of two different beam paths. The selection can be non-mechanical, and can reduce or eliminate the need for any external mechanical components.

In one aspect, the invention describes a means for modulating laser (MOPA) systems by other than external modulation. The modulation can be achieved prior to at least the final stage of amplification and involves establishing at least two signals, individually and separately modulating the signals and recombining the signals into an amplifier seed, whereby the two or more signals have one or more different optical parameters or characteristics, allowing them to be distinguished and separated following amplification. The configuration enables the output of even the highest power amplifier system to be modulated on demand with user defined modulation profile and duty cycle.

Optical systems, (e.g: laser systems) according to the invention preferably generate linearly polarised light. This is further preferable where polarisation is employed to differentiate between signals.

As used herein, the term "light" refers to electromagnetic radiation of any wavelength, whether visible or not. Light generated in embodiments of the invention may be infrared, e.g: near infra-red.

BRIEF DESCRIPTION OF THE DRAWINGS

In order that the invention may be more fully understood, embodiments thereof will now be described by way of example only, with reference to the accompanying drawings, in which.

DESCRIPTION

Example 1

Figure 1:
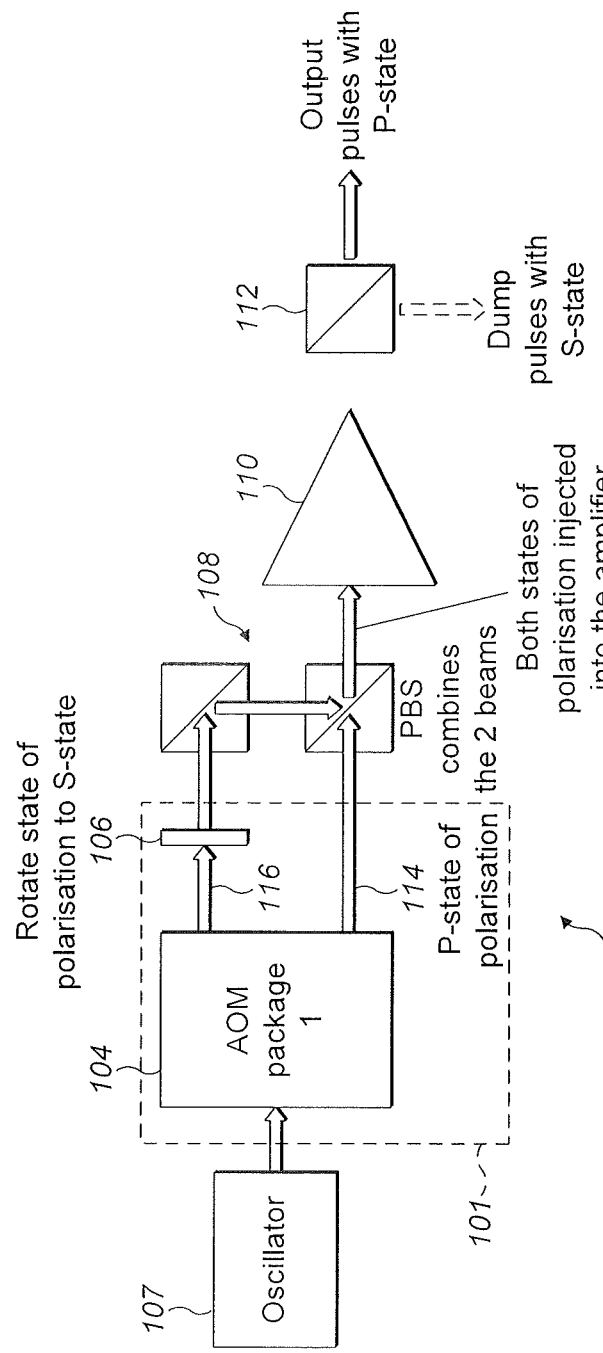
FIG. 1 shows a first example of a MOPA system according to an embodiment.

FIG. 1 illustrates a first example of an optical system 100 according to an embodiment of the invention. As shown optical system 100 includes an optical apparatus 101 comprising an acousto-optic modulator 104 and a polarization-altering component in the form of phase plate 106. The optical apparatus 101 receives linearly polarised light from an optical source in the form of an oscillator 107. The oscillator 107 may for example be a modelocked oscillator. The system 100 also includes a combiner 108, an amplifier 110, and discrimination device in the form of polarisation beam splitter (PBS) 112.

Figure 2A:
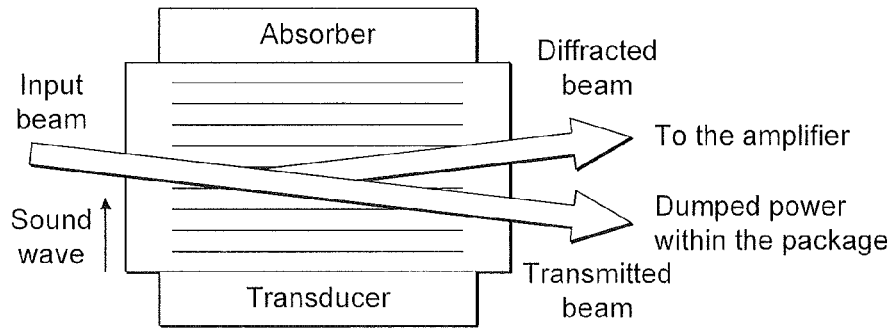
FIG. 2a is a schematic illustrating operation of an acousto-optic modulator (AOM)
Figure 2B:
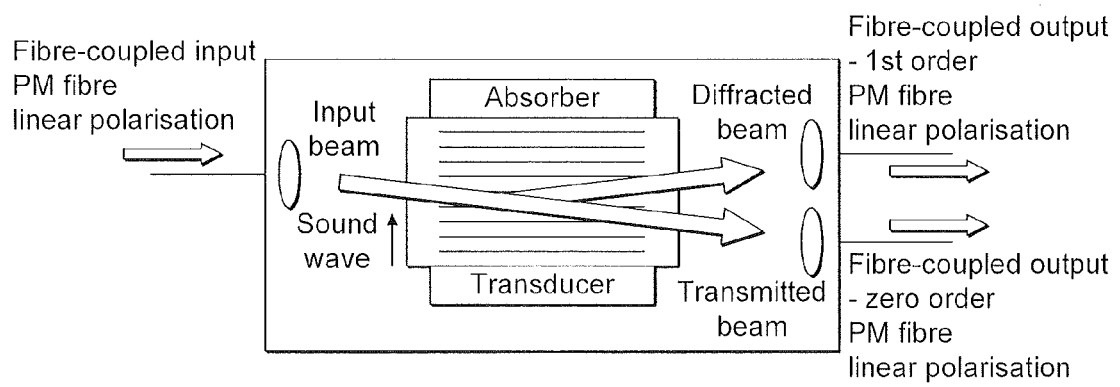
FIG. 2b shows a fiber coupled AOM with fiber coupled output of the diffracted and zero orders.

The operation of the AOM 104 is well known per se. Briefly, on application of an acoustic field to the acousto-optic (AO) crystal of the AOM, a standing wave is established within the crystal and, under the correct designed phase-matching conditions, a proportion of the propagating beam (determined by the diffraction efficiency of the device which is typically 70-85%) is diffracted and exits the crystal at a different angle to the non-diffracted portion of the beam. By applying the acoustic field in short pulses, it is possible to switch the diffracted beam on and off very quickly, determined by the frequency of the acoustic field and size of the beam. See FIGS. 2a and 2b. An RF amplifier can be provided to control the size of the acoustic field within the AO crystal. The angular separation of the diffracted and transmitted beam means that one can separate the diffracted and undiffracted beams. In this way, the AOM may be used to direct received light to different paths by selectively controlling the relative amount of light which is directed to different orders, responsive to an electrical signal.

In the optical system 100, both the diffracted first order 114 and the transmitted zero order 116 of the AOM 104 are collected and used in the system. The diffracted first order 114 propagates with one state of polarisation, defined in the Figure as P-state of polarisation.

The zero order light 116 is also collected and used, but the state of polarisation of the zero order is rotated through 90 degrees by the phase plate 106, to become substantially orthogonal to the diffracted order 114. In this way, optical apparatus 101 provides first and second signals 114, 116 with a polarisation difference therebetween.

The two beams are received at combiner 108 and polarisation combined into a single beam, which is injected into the amplifier 110. Between the AOM 104 and the combiner 108, it may also be beneficial to have control of the optical delay and relative losses between the two paths. The loss may be substantially balanced. The optical paths may be deliberately imbalanced slightly to make sure that pulses with substantially orthogonal states of polarisation do not overlap in time. This may be exploited to minimise any unwanted nonlinear effects within the amplifier or to pre-compensate for temporal effects including polarisation dependent dispersion within the amplifier or external optics.

As shown in FIG. 1, the polarising beam splitter 112 after the amplifier 110 rejects the zero-order, rotated polarisation pulses 106 and transmits the diffracted order pulses 114 to an optical output.

With this configuration, one can select the gating signal to the AOM 104 to achieve a desired pulse repetition rate or train of pulsed at the laser output. However, since both the diffracted and zero order 114, 116 are re-combined and injected into the amplifier 110, the seed to the amplifier 110 never changes and is effectively at the fundamental pulse repetition rate of the laser oscillator 107.

As a result, even though the repetition rate may be changed by adjusting the gating signal to the AOM 104, nonetheless the seed to the amplifier 110 remains constant, and this avoids the build up of excess noise which can otherwise occur if the amplifier is left unseeded for too long. This approach also avoids the amplifier gain becoming too high and unsustainable leading to catastrophic damage of the amplifier by self-Q-switching, which can also occur if the amplifier is left unseeded for too long. Thus, according to embodiments of the invention a desired repetition rate can be selected without the risk of excess noise or catastrophic damage to the amplifier.

Figure 3:
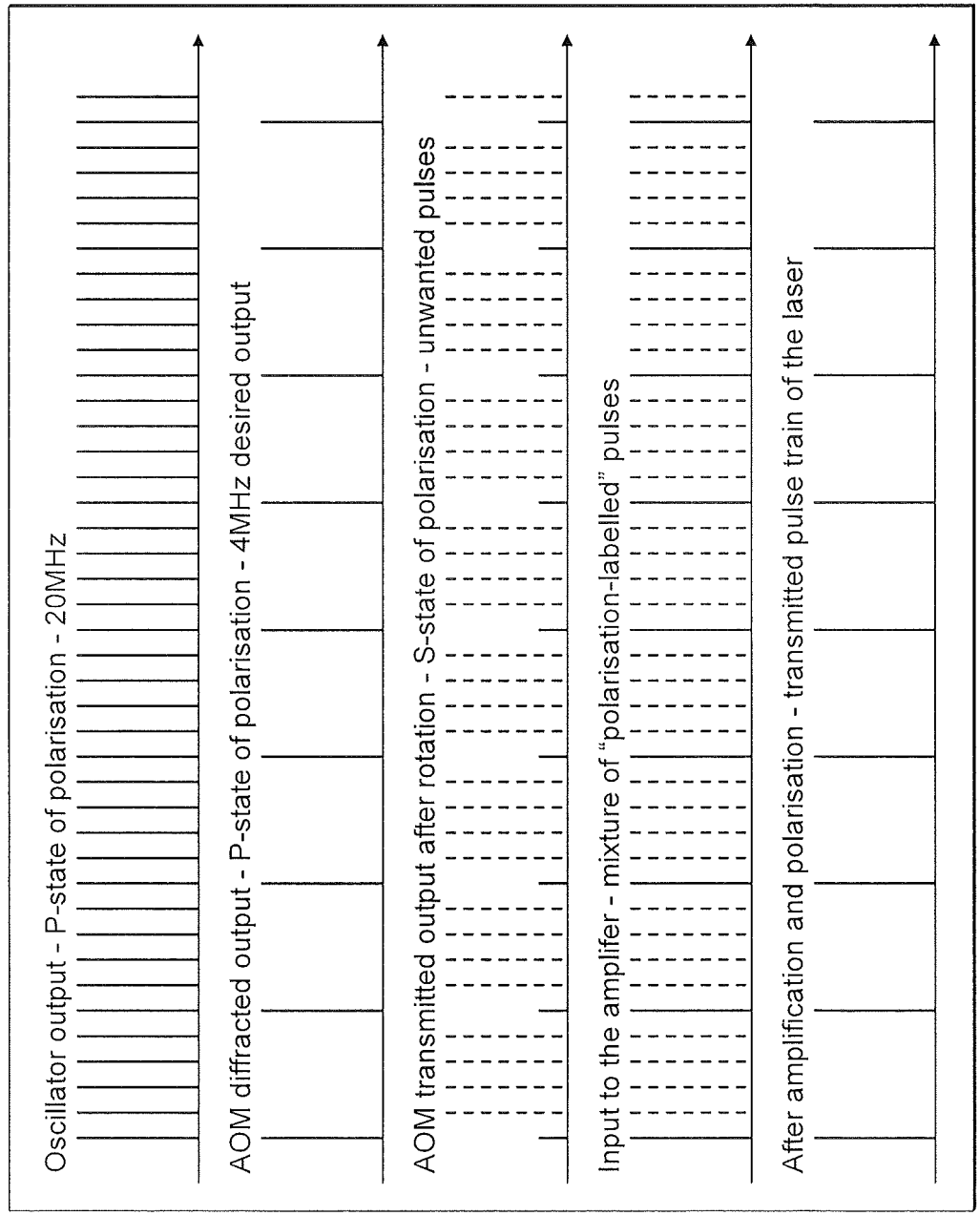
FIG. 3 is an example timing diagram for the first example with a pulsed oscillator and a specific set of selected pulses, and illustrates pulse repetition rate reduction.

The optical system 100 can be considered to be a MOPA system, since it comprises an amplifier 110, which amplifies light generated by an oscillator 107, FIG. 3 shows an exemplary timing diagram at different points of the system 100. In this example, the oscillator 107 is a modelocked oscillator at 20 MHz pulse repetition rate. Suppose that the end user application wants to have a 4 MHz output—ie: pulse picking of every $5^{th}$ pulse.

This figure also takes into account that there is approximately 15% non-diffracted light into the zero order. However, this has no effect on the final output pulse train after amplification and passing through the polarising beam splitter 112 after the amplifier 110, where the zero-order, rotated polarisation pulses are rejected.

Using this approach, one can use a low-power modulator, which is sufficiently fast to pulse pick at tens of MHz pulse repetition rate, yet deliver on-demand modulation of a pulse train. This system can, for example, function with a fundamental repetition rate of 40 MHz and an amplified average power of 100 Watts, yet have single-shot to 40 MHz operation, burst mode and very fast switching speed.

Figure 4:
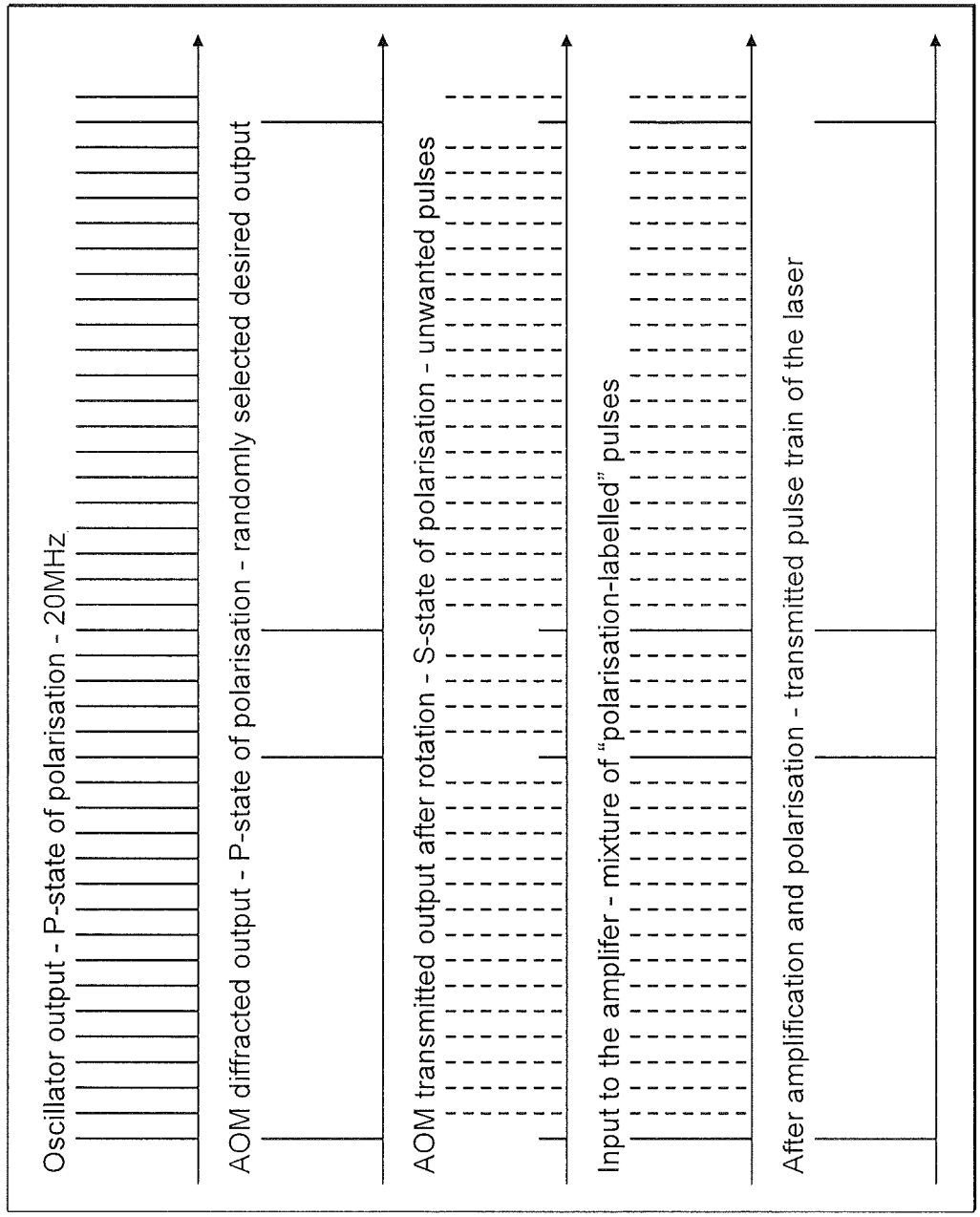
FIG. 4 is a timing diagram for an alternative set of selected pulses according to the first example, showing pulses on demand.

A second timing diagram (FIG. 4) shows the use of this system to achieve pulses on demand.

Thus the invention, in one aspect, can advantageously modulate at very high frequency and high average power.

Using this approach, the amplifier is seeded with pulses having a rep rate higher than the pulse picked rep rate, and the amplifier can be seeded at the fundamental pulse repetition rate (or even higher, depending on the delay introduced between the polarization and the diffraction efficiency), meaning that the amplifier is free-running and is effectively immune to the modulation sequence or pattern.

In many applications, one simply does not need extremely high pulse repetition rates. In these circumstances, the repetition rate of the oscillator can be first reduced prior to amplification, such that the amplifier only amplifies pulses that are wanted.

This can be achieved by a first low-power modulator after the oscillator and a second, slower, higher power modulator following final stage amplification.

Many further variations of the first example are possible. For example, although AOMs are referred to above for modulation, alternatively an electro-optic modulator (EOM) could be used, or another type of modulation apparatus having two outputs.

Figure 5:
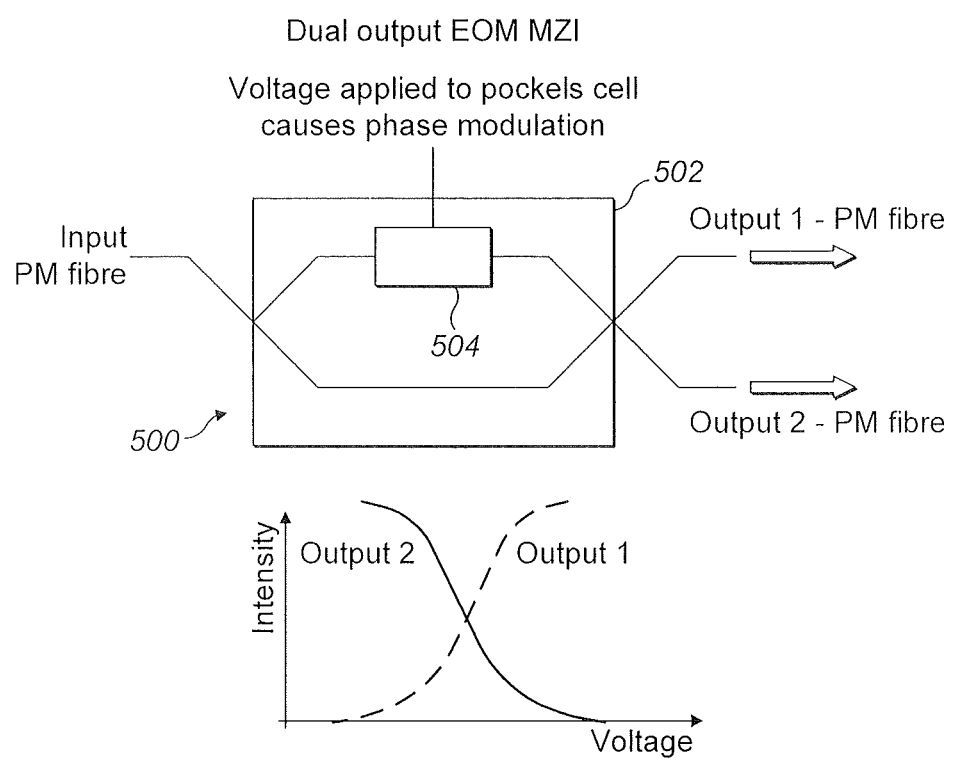
FIG. 5 is a schematic of an electro-optic modulation (EOM) pulse picker based on a Mach Zehnder interferometer with dual fibre output.

FIG. 5 describes a fiber-connectorised dual output version of an EOM pulse picker based on a phase modulated Mach Zehnder interferometer (MZI) 500. The EOM pulse picker is known per se, and will be described only briefly here. Within the device, the input beam (linearly polarised and delivered through a PM optical fiber) can be split into two paths of a MZI 502, where one of these paths passes through a Pockels Cell 504. Application of a voltage to this Pockels cell 504 causes a phase change in light propagating in this path of the MZI 502. The beams are then recombined, and two outputs are delivered of as linear polarised light propagating within two PM fibers.

The output intensity of the two outputs vary as a function of the phase change directly generated by the applied voltage, with the two outputs having inverse responses to the applied voltage.

The benefits of EO devices is that, for low-voltage devices which operate at modest optical powers (up to 1 Watt), very high speed phase and amplitude modulation can be achieved. One of the draw backs is that the amplitude response may not have be linear with applied voltage (see FIG. 5). In addition, thermal effects mean that the electronics need to be controlled very carefully to attain a stable amplitude ratio and good extinction between the two output arms.

With both AOM and EOM technologies the beam is typically focussed quite tightly through the modulator crystal if one is interested in fast switching speeds. For AOMs the speed of modulation depends on the speed of sound waves within the AO crystal and the distance that the sound wave must travel through the crystal in order to interact with the optical field of the laser beam—this is determined by the laser beam spot size and therefore a small beam is required for the fastest rise time. For EOM's, thermal effects limit the power density such that higher power operation necessitates larger apertures of the Pockel's cells and the required voltage becomes very large, resulting in relatively slow switching rates due to capacitance effects.

Embodiments of the invention may, for example, be applicable within the printing industry, e.g: in laser writing of printing plates. For example, in producing printing plates, laser writing may be used to modify the surface structure of the printing plate locally where the laser beam interacts with the surface. Typical resolutions (1200 to 2400 dots per inch), sizes of the printing plates (often >1 $m^2$) and the need to produce the plates within a short time scale, means that the laser should be modulated at very high speed, typically greater that 10 MHz and as high as 100 MHz. The printing application can benefit from full control of the laser beam to select, at this speed, whether the laser beam should be on or off. This is because the system can have no pulses for long periods of time (for example to produce a large area of printing area to be "inked") or can alternatively operate at the maximum pulse repetition rate for long periods of time (to produce a large print area where there is to be no ink). Each time a pulse of light is delivered to the work piece (printing plate) a dot will either be printed or not printed.

Example 2

Figure 6:
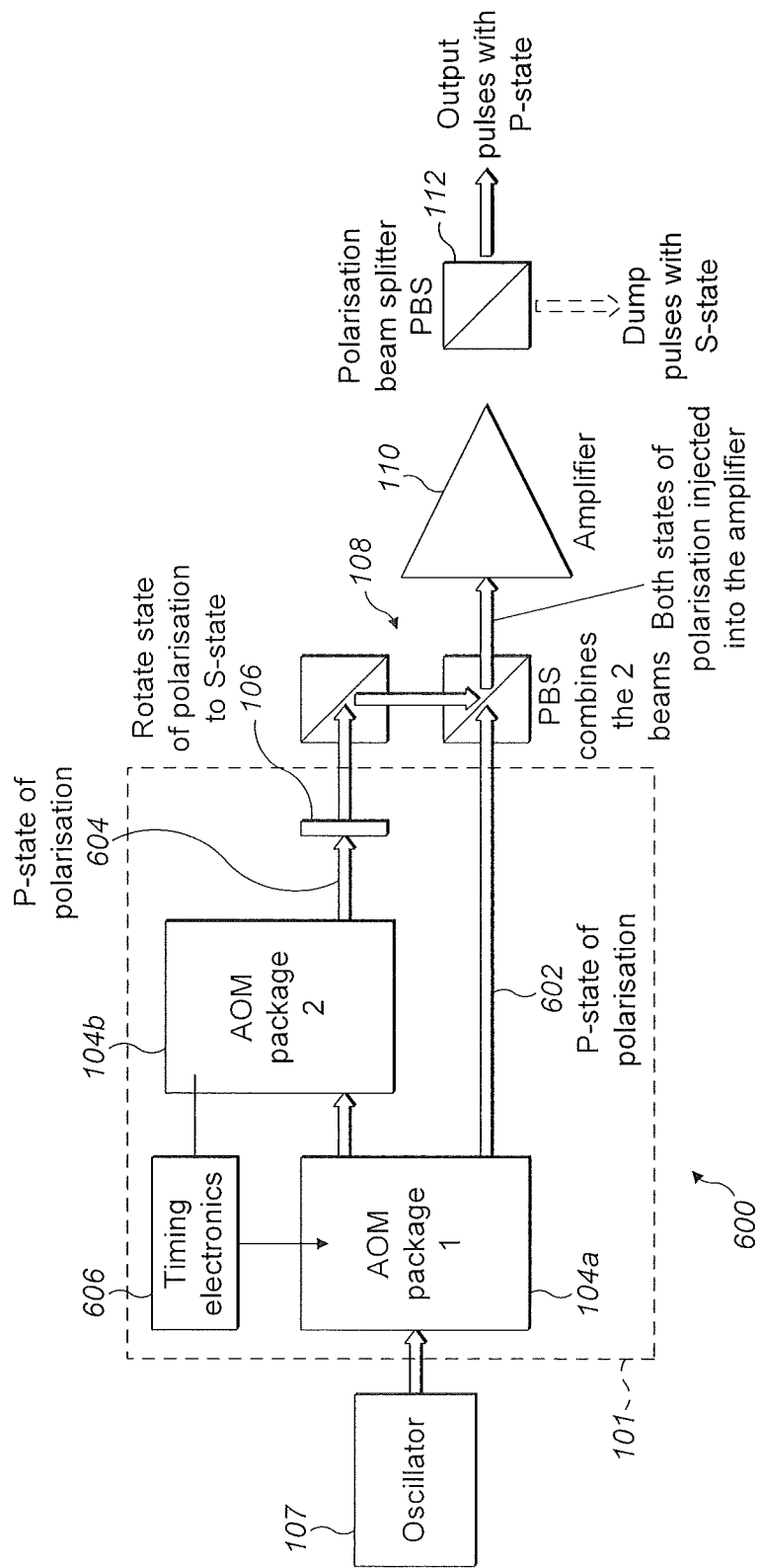
FIG. 6 is a schematic of a second example system using two modulators according to an embodiment.

A second system design, also based on the use of polarisation and modulation, is shown in FIG. 6. The system of FIG. 6 is substantially the same as the system of FIG. 1, apart from the following modifications. The same reference numerals are retained for corresponding features.

This optical apparatus 101 of the system 600 of FIG. 6 includes two modulators 104a, 104b rather than one, with the zero order output of the first modulator 104a used as the input to the second modulator 104b.

The diffracted order output beam 602 from the first modulator 104a propagates with one state of polarisation and the diffracted order output beam 604 from the second modulator 104b passes through a polarisation rotator (phase plate) 106 such that the beam has an substantially orthogonal state of polarisation to the first modulator diffracted beam 602.

This system can be operated in a number of ways. It can operate as the same as the previously described system, can be operated (e.g., by maintaining the fundamental repetition rate of the oscillator throughout the system), enabling modulation from single pulse to the fundamental frequency of the oscillator. In this case, the non-diffracted light from the first modulator does not pass through to the amplification stage, thereby making the amplifier slightly more efficient.

Figure 7:
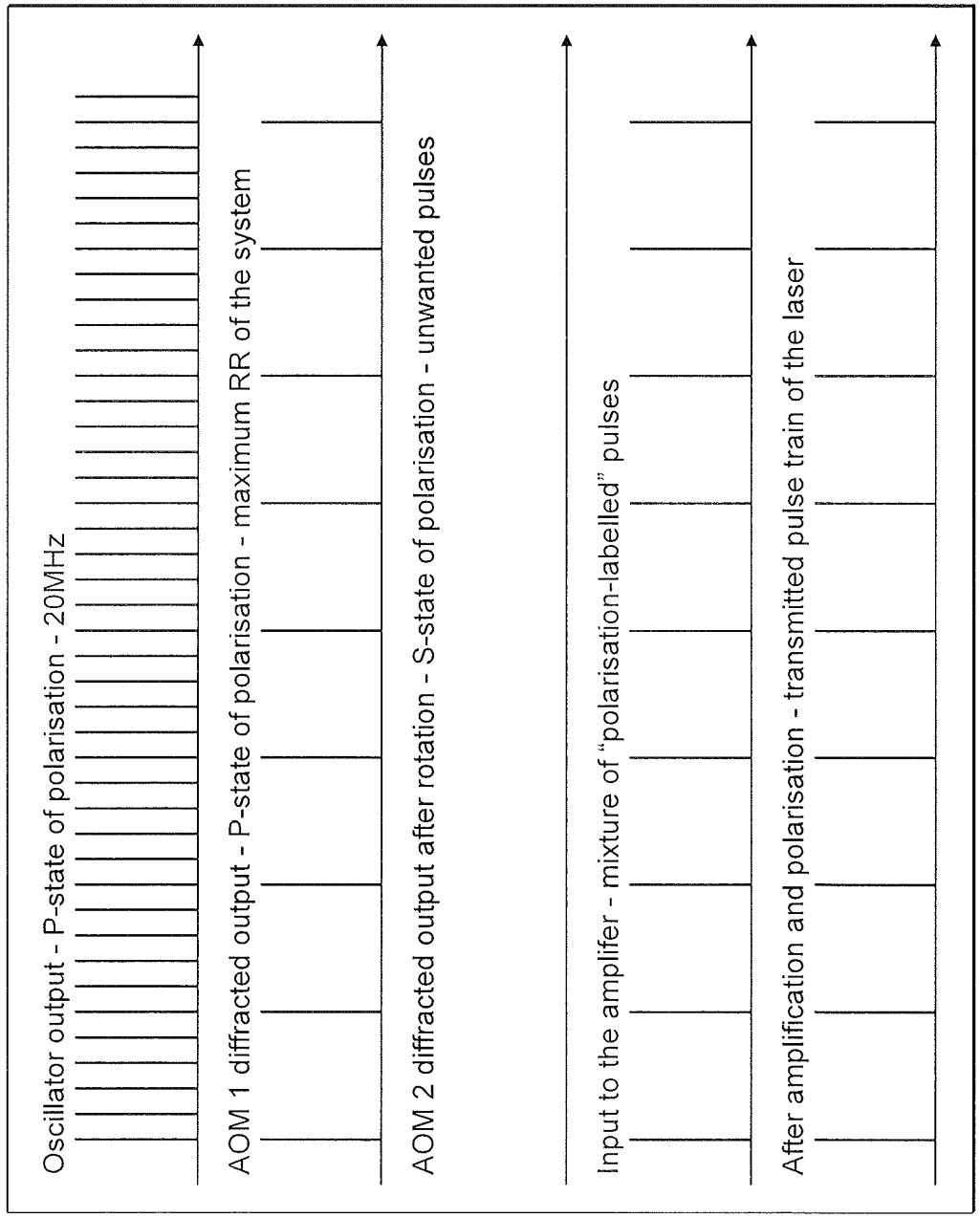
FIG. 7 is a timing diagram for a system according to the second example using a specific set of pulses, and illustrates pulse repetition rate reduction.

A more useful aspect of this architecture is that one can adjust the timing electronics 606 such that a maximum repetition rate of the system is attained and set. For example, (FIG. 7 shows timing diagrams for a pulsed MOPA) we choose a maximum pulse repetition rate of 4 MHz for this system. It is not straight forward to build a modelocked oscillator at 4 MHz, so the oscillator is built at 20 Mhz in this example.

The system can be used simply as a direct pulse picker, reducing the pulse repetition rate from 20 MHz to 4 MHz. Here the first AOM 104a modulates at 4 MHz, providing the 4 MHz pulse train to the diffracted order output beam. Modulator 2 104b in this example is therefore left closed and all 4 MHz pulses are transferred to the amplifier with the same state of polarisation. Following amplification, all pulses transmit through the output polarising beam splitter to give a 4 MHz amplified output.

Figure 8:
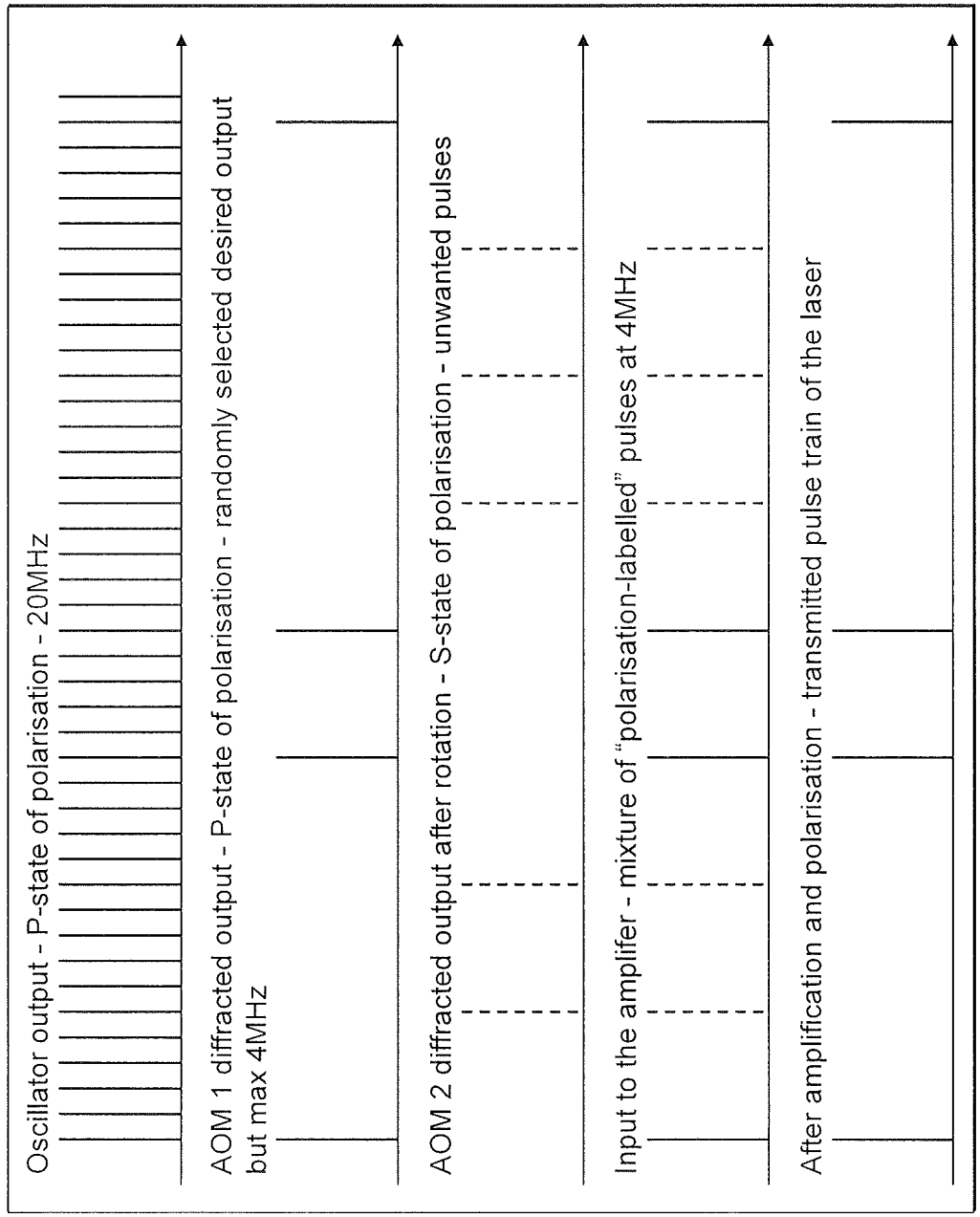
FIG. 8 is an alternative use of the second example system showing an exemplary timing diagram for a specific case of pulse selection on-demand.

A further demonstration of Example 2 is shown by the timing diagrams of FIG. 8, showing the case where a system can provide modulation from single shot up to a selected rate (e.g., 4 MHz, typically defined by the application). This maximum repetition rate can be defined anywhere up to the fundamental of the oscillator but is preferably chosen to be as low as the application needs in order that amplification can be efficient.

Example 3

Figure 9:
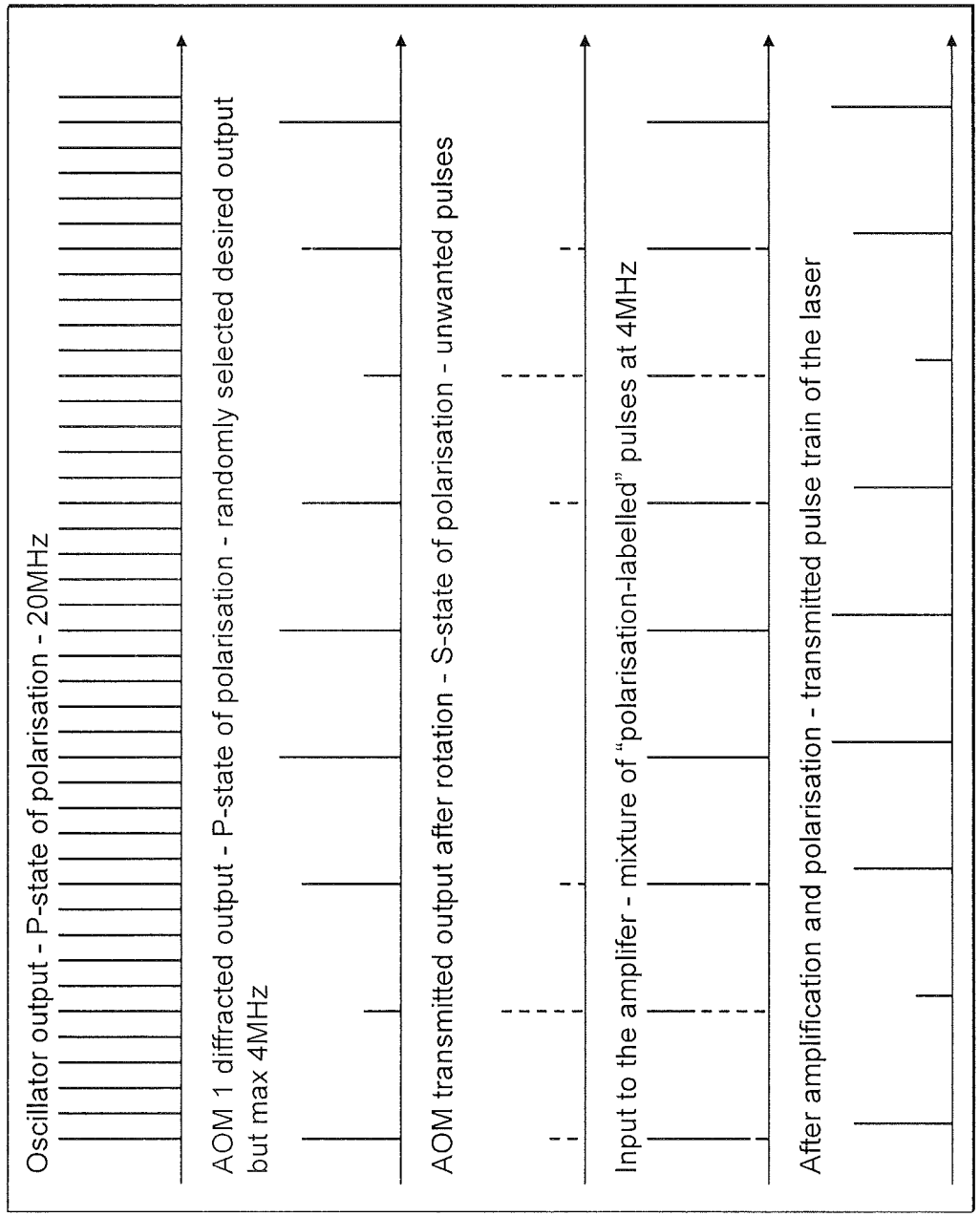
FIG. 9 is an exemplary timing diagram showing fast pulse amplitude control.

The same approach can be used to achieve, not only pulse selection but fast pulse amplitude control and hence the ability to modify the pulse energy of each individual pulse following amplification. FIG. 9 shows an example of how this can be achieved with the aid of pulse timing diagrams.

One can achieve this performance using the two modulator example of FIG. 6 and by having both amplitude and digital control of each of the modulators. For AOMs amplitude control involves adjustment of the diffraction efficiency of light into the diffracted order. This is achieved by controlling the magnitude of the RF amplifier power which controls the size of the acoustic field within the AOM crystal. AOM amplitude control is well known per se to those skilled in the art.

For EOM devices, amplitude control involves changing the magnitude of the applied voltage to the crystal.

Referring to FIG. 6, maximum output pulse energy following amplification and polarisation can be achieved by applying the maximum level of RF power to the first AOM 104a and causing optimum diffraction for a chosen pulse propagating through the first AOM 104a into the first diffracted order. Correspondingly, the second AOM 104b may have a minimum applied RF power for the period of time corresponding to this pulse, resulting in no output of light through the diffracted $1^{st}$ order of the second AOM 104b.

Correspondingly, to have minimum pulse energy for a given pulse following amplification and polarisation, minimum RF power is applied to the first AOM 104a, resulting in no pulse energy propagating to the first order of the first AOM 104a, and maximum RF power is applied to the second AOM 104a, diffracting the maximum amount of pulse energy into its first order output.

In order to have any level of pulse energy in between minimum and maximum, one can synchronise both AOM RF amplifiers to provide different levels of RF power to each of the devices, such that the sum of the two diffraction efficiencies results in a constant total pulse energy when the two pulses are summed together following re-combination (with substantially orthogonal states of polarisation). This is depicted in FIG. 9 in the $4^{th}$ timing diagram.

Following transmission through the output polariser after amplification, only one of the pulses of a given polarisation passes through to the laser output, shown by the bottom timing diagram in FIG. 9. The rejected pulses may be dumped within the laser chassis, although these pulses may be utilised in some applications.

Example 4

Figure 10:
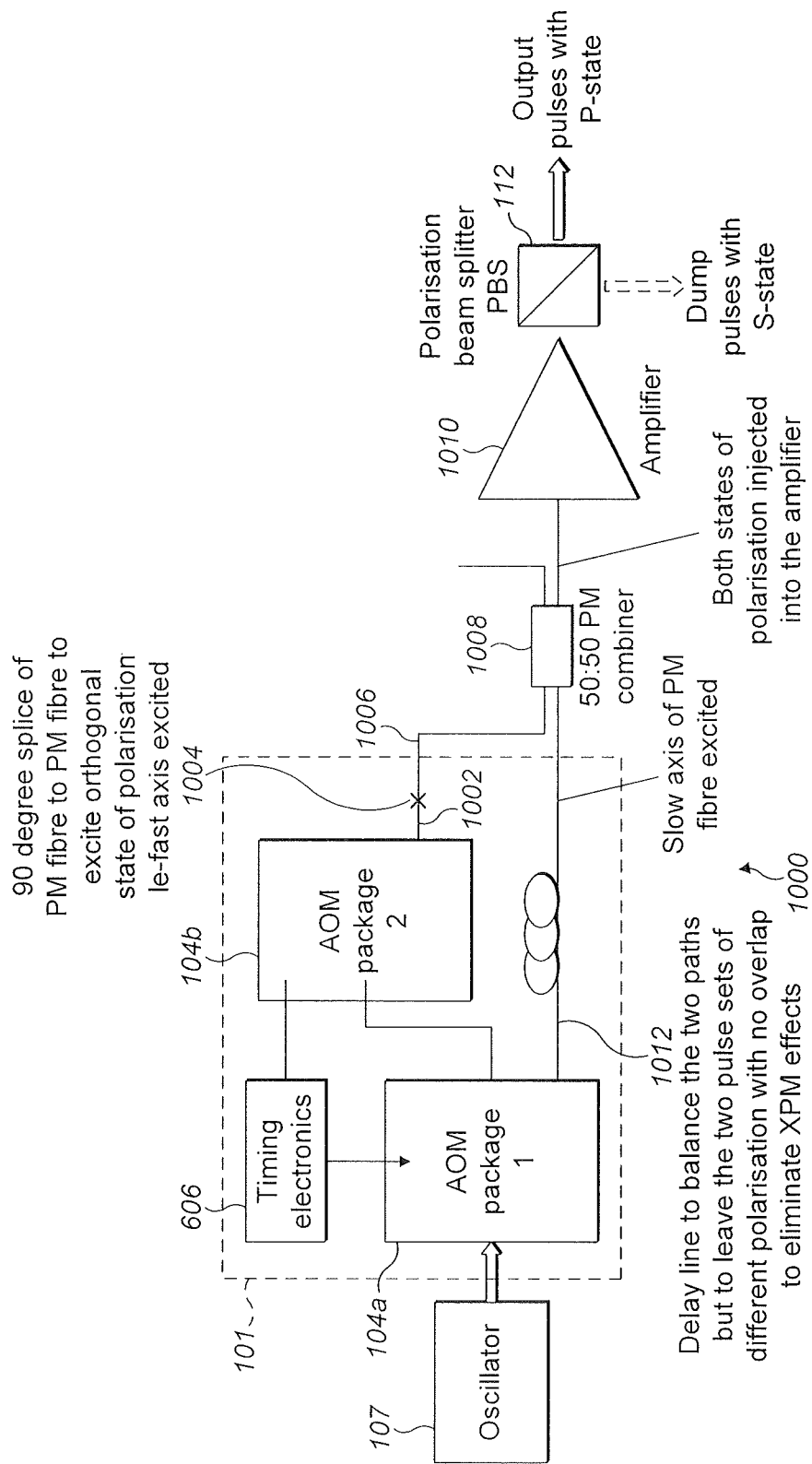
FIG. 10 is a schematic of an example system implemented within a fibre-MOPA architecture.

FIG. 10 shows a non-limiting example of how the system may be implemented in an all-optical fiber approach, for example within a modelocked fiber laser MOPA system. The optical system 1000 of FIG. 10 is substantially the same as the system of FIG. 6, apart from the following modifications. The same reference signs are used for corresponding features.

In the example of FIG. 10, the modulators 104a, 104b comprise AOMs and are fiber coupled. The second modulator 104b comprises a standard single output, diffracted order AOM. The first modulator is customised to have both the diffracted and the zero order delivered through polarization-maintaining (PM) optical fiber 1002.

Instead of a phase plate 106, the optical apparatus 101 comprises a 90 degree splice 1004 between the polarization-maintaining optical fiber 1002 at the output of the second modulator and a second piece of PM fiber 1006. In this way, the state of polarisation from the second AOM can be rotated through 90 degrees, simply by splicing the polarisation maintaining fiber at 90 degrees to a second piece of PM fiber.

The two orthogonally orientated fibers are combined using a conventional 3 dB (50:50) PM optical coupler 1008. Alternatively a fiber-coupled polarisation combiner can be used, having an additional advantage of low transmission loss. The coupler provides two outputs, one of which is used to seed a PM amplifier system 1010. The second is available either as a monitor or to seed a second amplifier system, for example.

The optical apparatus 101 of system 1000 may also include a delay line 1012 to balance the two paths but to leave the two pulse sets of different polarisation with no overlap to eliminate XPM effects.

These examples advantageously demonstrate a non-external modulator being used to achieve fast modulation. In some applications, an external modulator need not be used, and fast modulation is achieved solely by internal modulation.

Example 5

Figure 11:
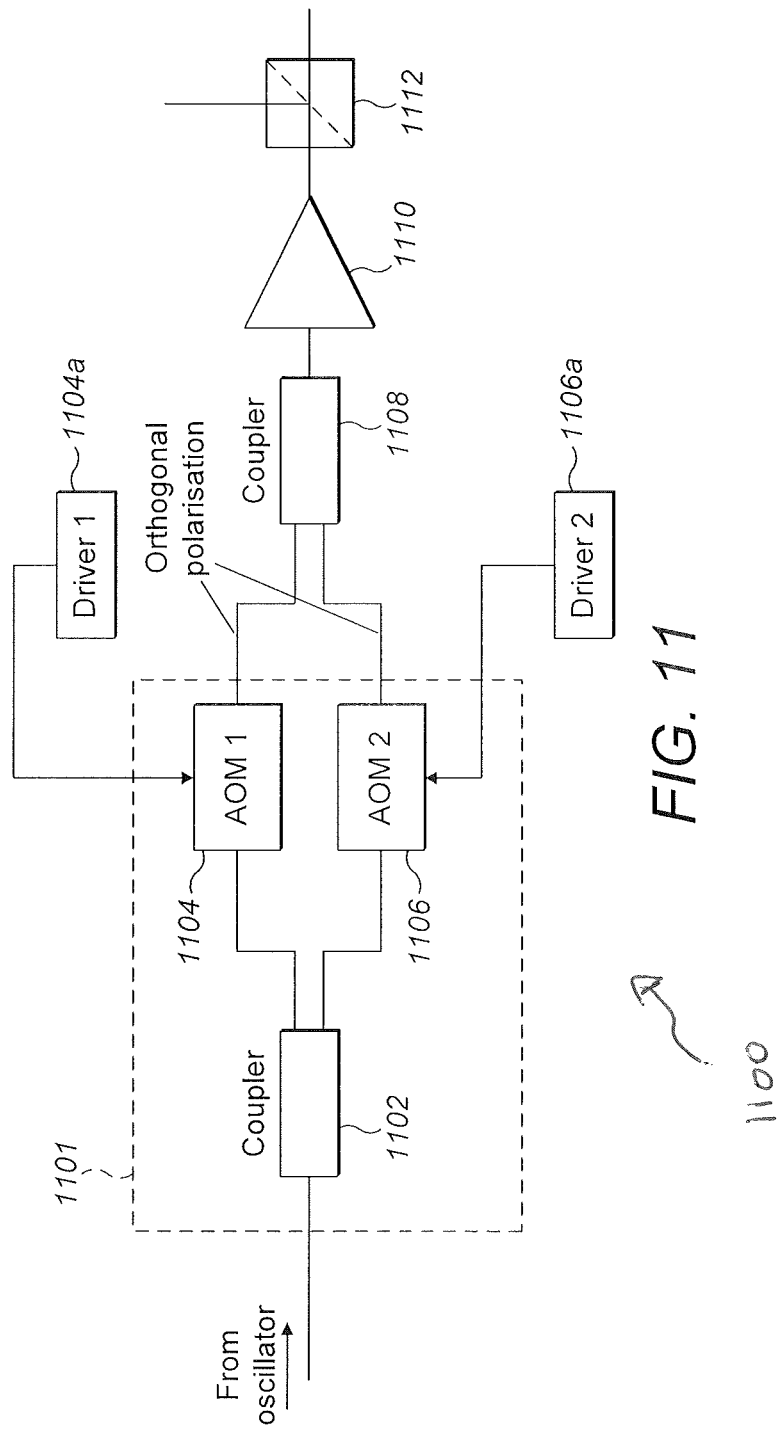
FIG. 11 is an optical schematic according to another example.

FIG. 11 shows schematically (using an all-fiber configuration of the source) an alternative approach to achieving fast modulation using two modulators and exploiting polarisation properties of the two modulator outputs. The system 1100 includes an optical apparatus 1101 comprising a splitter in the form of coupler 1102 which splits received light into different paths. The optical apparatus 1101 further comprises a first fiber-coupled AOM 1104 located along one of said paths, and a second fiber-coupled AOM 1106 located along the other path. The system also includes a combiner in the form of a second coupler 1108 and an amplifier 1110. The system further comprises a discrimination device 1112. The first AOM 1104 will also be referred to as AOM1, and the second AOM 1106 will also be referred to as AOM2.

In this example, the diffracted order of each of the AOMs is used to achieve the solution of having fast modulation whilst maintaining a reasonably consistent or other desired seed level to the power amplifier system. The zeroth orders or one or both need not be used.

FIG. 11 omits the oscillator from the diagram. However, working from the left side of the schematic, the output from a laser oscillator (preferably but not necessarily a high repetition rate pulsed master oscillator such as a modelocked ultrafast fiber laser) is passed through the coupler 1102 which splits the laser power into two output paths, preferably of similar output power. For example, this coupler can be a 50:50 Polarisation Maintaining fused optical fiber coupler and the two outputs of this coupler can have nominally identical power and polarisation. Alternatively the coupler can be a fiber-coupled polarisation combiner component.

Each of the outputs of the coupler can be spliced to the input of a fiber-coupled acousto-optic modulator (AOM) 1104, 1106, each of which has an output fiber coupled to its diffracted order, thus delivering, with minimum insertion loss, diffracted light through the device when activated.

As with previous examples, the system is arranged such that, prior to re-combination in the second coupler 1108, the two outputs have substantially orthogonal states of polarisation. This can be achieved either within the AOM devices 1104, 1106 (by actively exciting each of the AOM output fibers on different polarisation axes) or by splicing either the input fiber or output fiber of one of the AOMs at 90 degrees such as to ensure substantially orthogonal polarisation states propagate through each of the AOM arms prior to re-combination.

Each of the AOMs has a separate RF driver 1104a, 1106a, which is timed to determine whether the AOM is on (diffracts the light to the fiber-coupled output) or off (dumps the light within the AOM package, or alternatively passes the un-diffracted light to another port or beam dump (not shown).

Timing electronics for the system (not shown) can be used to achieve various different functions of the invention as described within examples of this invention record. For example, as a direct pulse picker system, AOM1 and AOM2 would be driven in direct anti-phase to one another, meaning that when AOM1 diffracts light to its output, AOM2 is off and when AOM1 is off, AOM2 is driven to be on, and diffracts light to its fiber-coupled output.

After recombination in the coupler 1108 prior to amplification, the power is maintained at a fairly consistent level, maintaining a consistent seed level to the amplifier. Within the seed signal, there will be a varying state of polarisation of the light with time, determined by the sequence of operation of the two AOMs 1104, 1106.

Following amplification, a discrimination device in the form of a polarizing device 1112 discriminates the signal into substantially orthogonal states of polarisation, resulting in time-varying signals at the two outputs of the polarizing device (shown here as a polarising beam splitter).

Example 6

Figure 12:
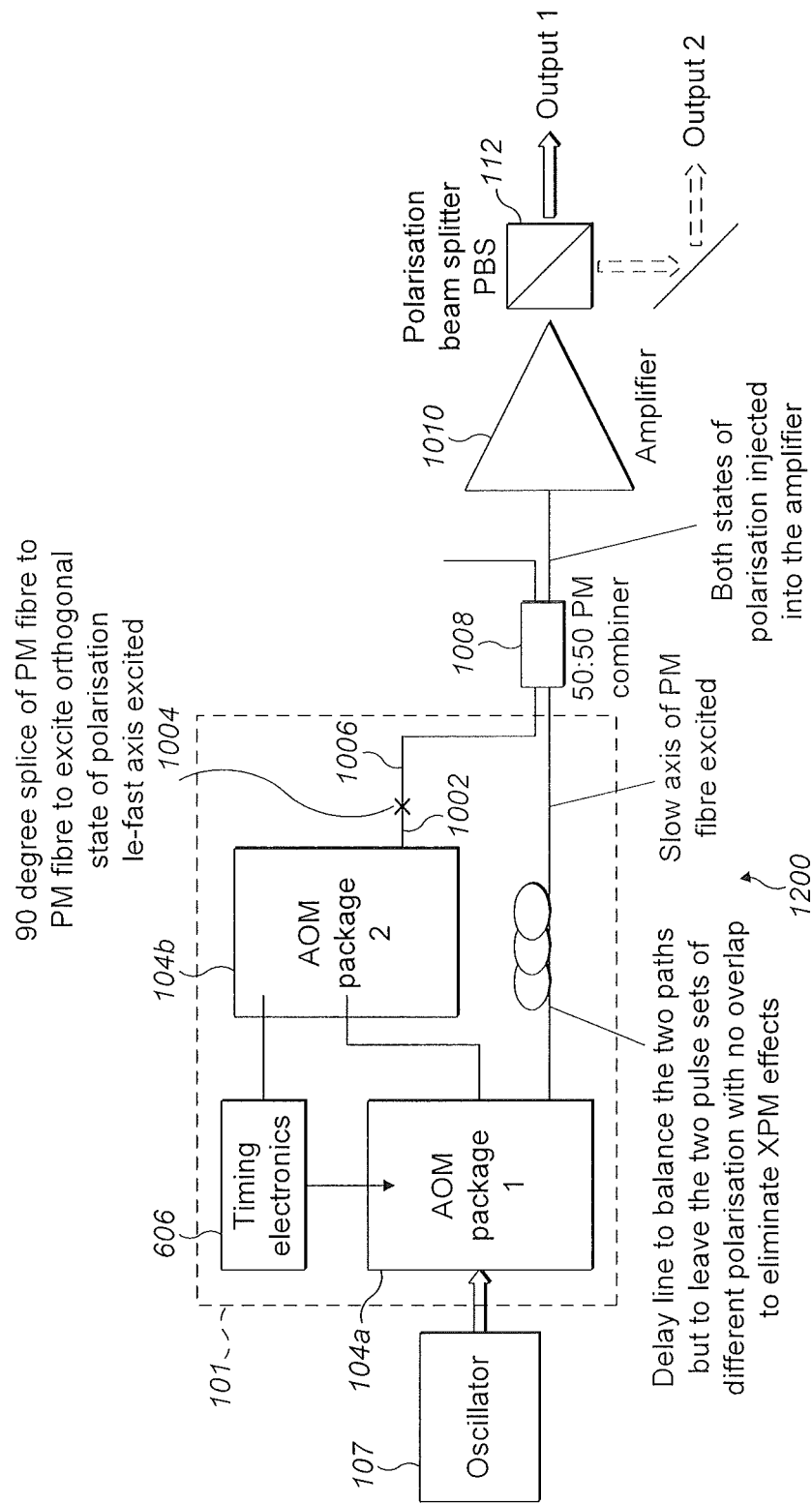
FIG. 12 is a schematic of an exemplary fibre MOPA system employing two modulators and capable of preferentially switching a free-space beam between two outputs without the need for external switching of the beam.

FIG. 12 shows another optical system 1200 according to a sixth example. Optical system 1200 is substantially the same as the system of example 4, described above with reference to FIG. 10, apart from the following differences. The same reference numerals are used for corresponding features.

In the sixth example, both outputs of the polarisation beam splitter 112 are used. Harmonic generation optics (not shown) may be used at one of the outputs so that the optical system 1200 provides an output signal at the fundamental wavelength and an output signal at a harmonic wavelength (e.g: $2^{nd}$ harmonic wavelength). These are identified in FIG. 12 as output 1 and output 2.

The system of FIG. 12 can also be used to advantageously non-mechanically switch the beam path of a laser beam.

Figure 13:
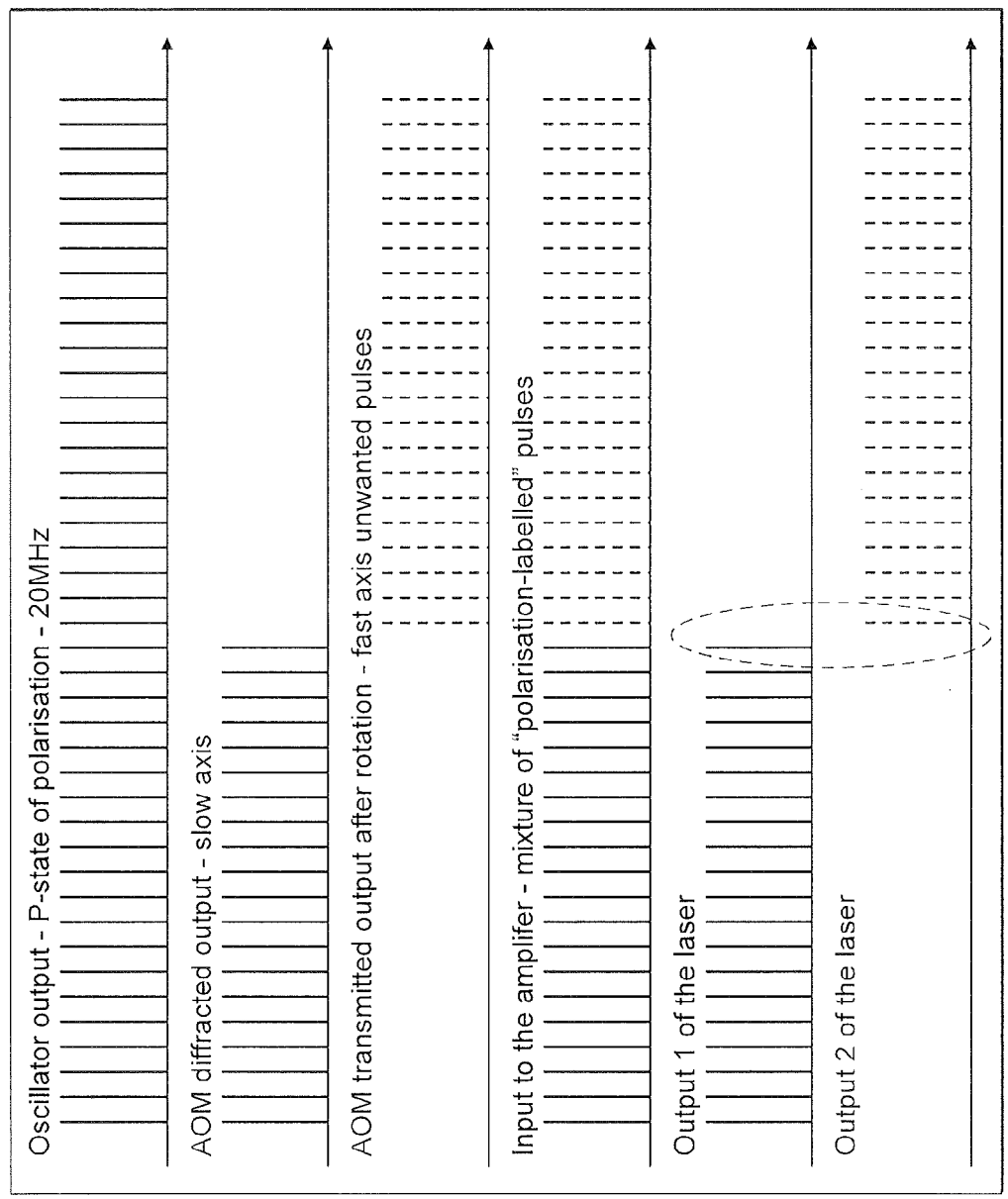
FIG. 13 is a timing diagram for an exemplary pulsed MOPA, showing switching the pulses of a laser from a first to a second output using polarisation modulation.

The timing diagram of FIG. 13 shows how this system can operate in one specific embodiment where it is desired have fast switching between two outputs, in generating a fast, motion-free switch of the beam path from output 1 to output 2 using the combination of low-power modulators and polarisation switching and re-combining.

To deliver fundamental wavelength output through output 1, the first AOM 104a is used to deliver linear polarised light on the slow axis of the amplifier 1010. To switch (within as little as 20 nanoseconds) from output 1 to the second harmonic laser output (2), the first AOM 104a is switched off, resulting in all light transmitted to the zero order and into the second AOM 104b.

This approach can advantageously allow fast switching, with no mechanical moving parts, reliably and repeatably between two outputs. And this can be attained a very high repetition rates.

Example 7

In a further example, the method of switching between output beams described in Example 6 is combined with any of the previous examples showing fast modulation of a MOPA system.

Using this combination, amplitude control of each of the two modulators as described in example 3 can be used to independently modulate the two outputs of a laser, for example delivering different harmonics of the laser output.

This approach allows one to modulate the laser output 1 with high speed and from single shot to high repetition rate but also enables one to switch to a second output of the laser and achieve the same fast modulation control. In this system one would preferably but not always block the unwanted output using, for example, an external laser shutter as is commonly installed in most high power laser systems.

This system is particularly advantageous in a materials processing system where one wishes to select between two different outputs beams AND have full and fast control of the pulse energy of either of the laser outputs. In this method the relative amplitudes of each pulse at each of the two outputs can be adjusted without a need to adjust the gain of the amplifier itself. This can be particularly attractive if one wishes to have a switchable dual colour laser system (Fundamental and SHG for example) AND one wishes to be able to have fast modulation and energy control of each of the outputs.

Alternatively, one can simply have two different beam paths for the output of a laser and simply select between the two without needing to have mechanical switching which results in spatial deviation of the beam over time and between multiple switching operations.

Further Embodiments

By way of example and not limitation, it is noted that using the basic principles described within previous examples, there are many additional applications and modifications of the systems that can be implemented to achieve different end goals. These will be described here by way of examples—

Example 8

Multiple Beam Delivery Systems

Many materials processing applications require multiple beams to achieve parallel processing of different regions of a work piece. Most commonly, each of these outputs requires individual control of amplitude and, in the case of pulse systems, requires its own modulation.

In large frame DPSS laser systems, capable of delivering very high pulse energies, the laser beam is typically split into multiple beams using partial reflectors and free-space beam steering.

For fiber-based systems, due to compact size, it is possible to have a single oscillator and multiple amplifiers, each of these amplifiers being arranged in its own package to allow the application of several different outputs in different locations.

Figure 14:
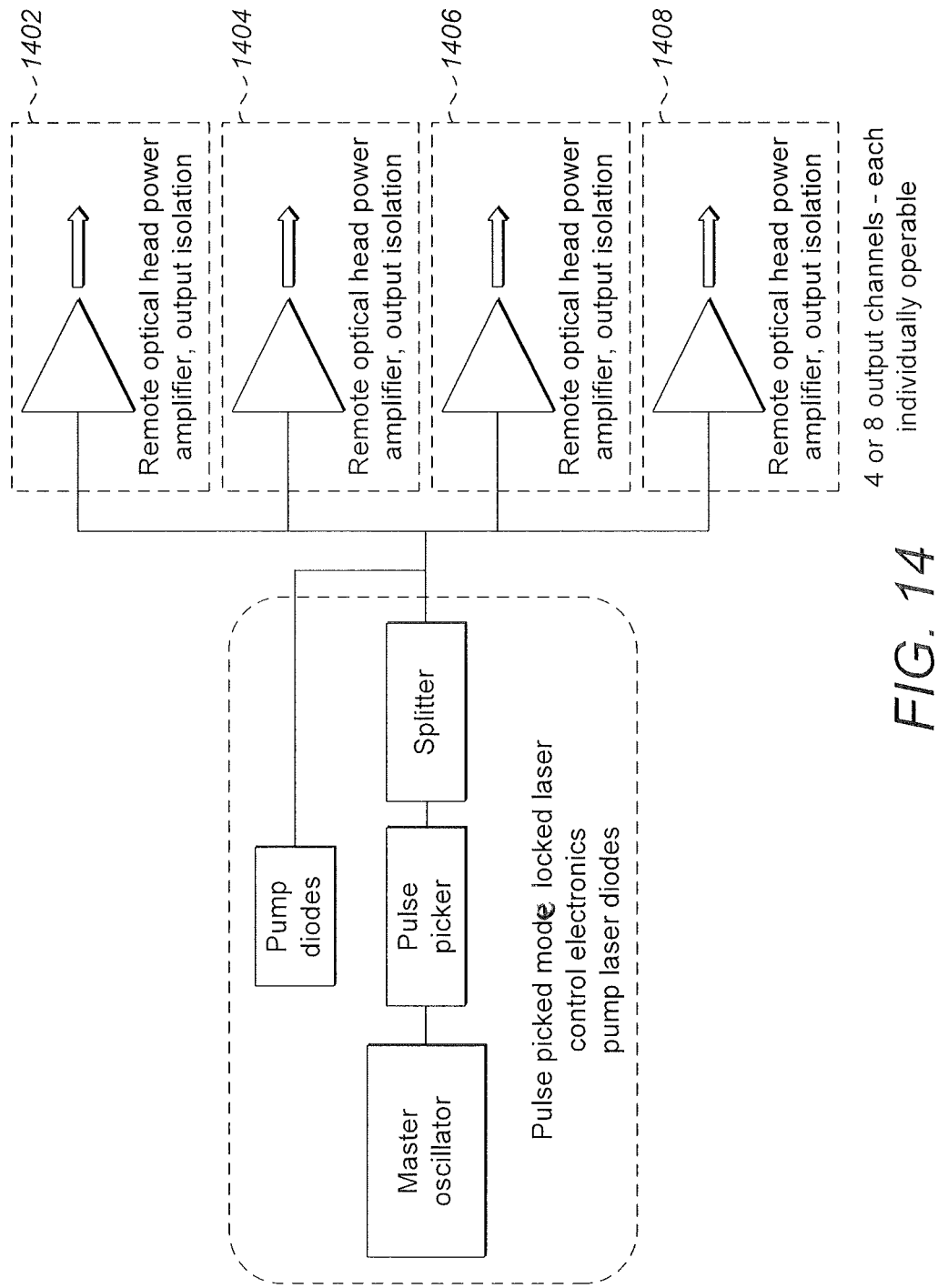
FIG. 14 shows an example of a multi-output laser system using external modulation of each of the outputs.

Such a system can be achieved at low repetition rate and relatively low powers by having multiple amplifiers each with its own external modulator. Such a multiple output system based is shown in FIG. 14 where each of the four output amplifiers 1402, 1404, 1406, 1408 can have its own external modulator. The external modulators can be capable of relatively low speed (up to a few MHz) modulation.

In building this system with a series of external modulators, the size of each of the laser output enclosures becomes quite large, each requiring alignment of a beam through the modulator. Moreover, these systems are limited to modulate at relatively low speeds.

An alternative approach is to generate multiple seeds, each modulated at low power using the techniques described previously, and injecting each of these seeds into one or more amplifiers with output polarisation discrimination and/or beam deflection.

Figure 15:
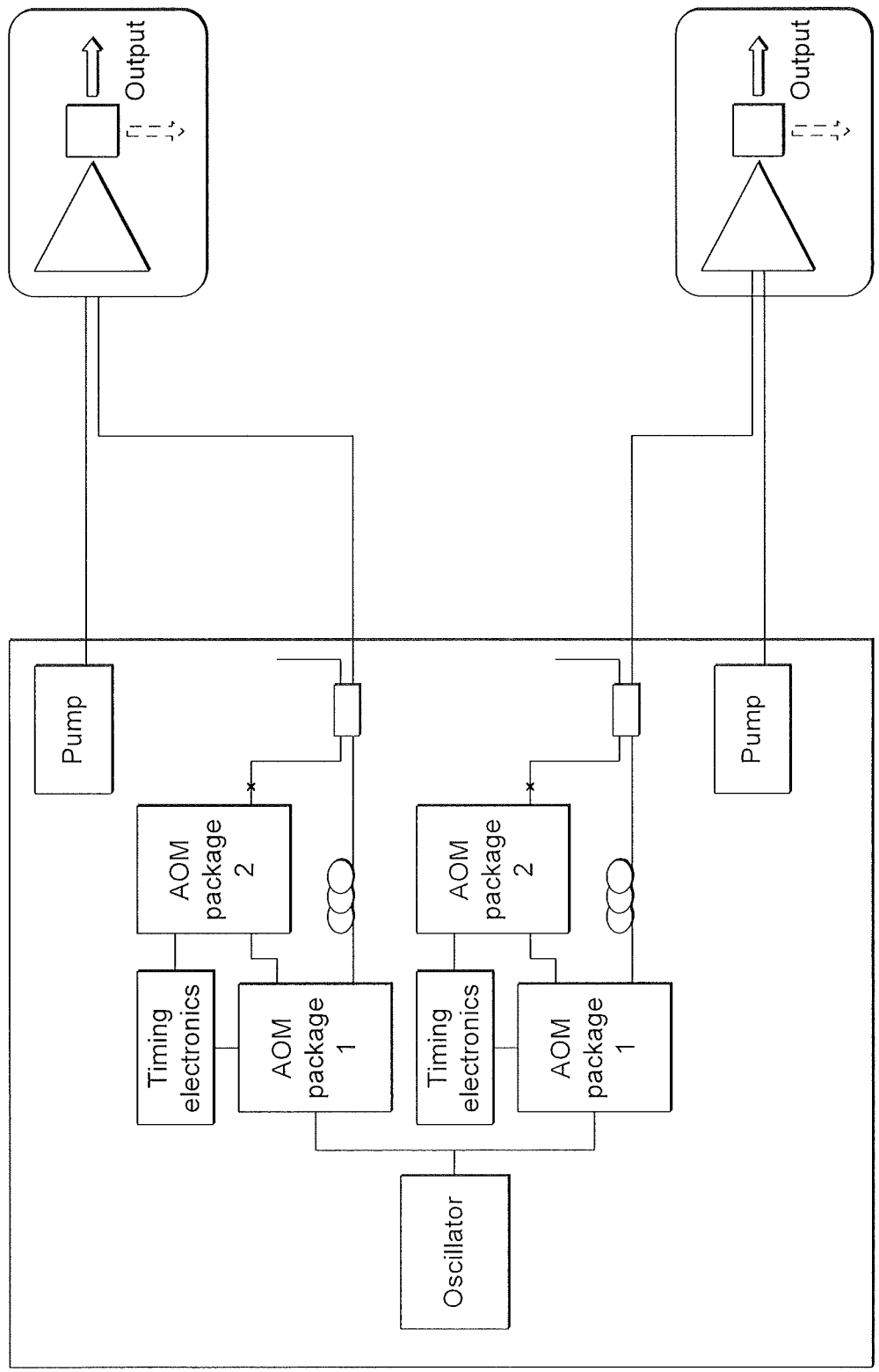
FIG. 15 illustrates an exemplary system for delivering multiple output beams, each capable of modulation at high speed and high power.

FIG. 15 shows a schematic of such a system showing two remote heads, by way of example.

Example 9

Nonlinear Spectral Generation with User Defined Modulation

Embodiments of the invention are applicable not only to high pulse energy laser systems for materials processing, but also for scientific lasers including lasers generating harmonics, super continuum and other nonlinear optical phenomena such as 4 wave mixing.

Figure 16:
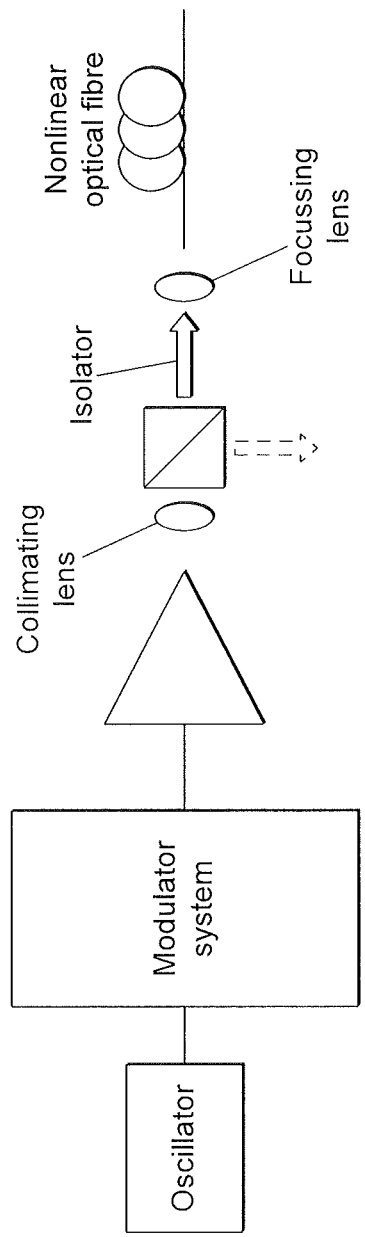
FIG. 16 illustrates generating supercontinuum or 4 wave mixing with user-defined pulses on demand, according to an embodiment.

The schematic of FIG. 16 shows an example system whereby supercontinuum pulses, generated within photonic crystal fiber, can be delivered at repetition rates from single shot up to tens of MHz. Whilst variable repetition rate supercontinuum sources are commercially available (from Fianium SC400-PP for example), they typically work only at continuous repetition rate and typically do not provide an ability to reduce to below 100 KHz where amplifier noise becomes excessive and it becomes difficult to achieve sufficient peak power from the amplifier due to this noise limitation.

By applying the techniques described within this invention and ensuring that the amplifier is continuously seeded at a fairly constant level, one can switch the supercontinuum off completely for long periods of time without affecting the amplifier. This can be achieved with very fast rise times, not achievable using external modulation, a chopper or shutter, and can therefore modify the amplitude and spectral bandwidth of each individual pulse, allowing single shot, burst mode operation and high repetition rate quasi-cw from a single laser system. As is evident to the skilled worker from a reading of the present disclosure, beam discrimination, though shown upstream of the nonlinear fiber in FIG. 16, can alternatively be provided downstream of the nonlinear fiber.

Example 10

Dual Pumping of Nonlinear Materials

Optical systems according to embodiments of the invention may be used to synchronously pump a nonlinear material using two different outputs. An example is the generation of both Fundamental and Second Harmonic in two different beam paths and combining these, injecting them into a nonlinear element.

Figure 17:
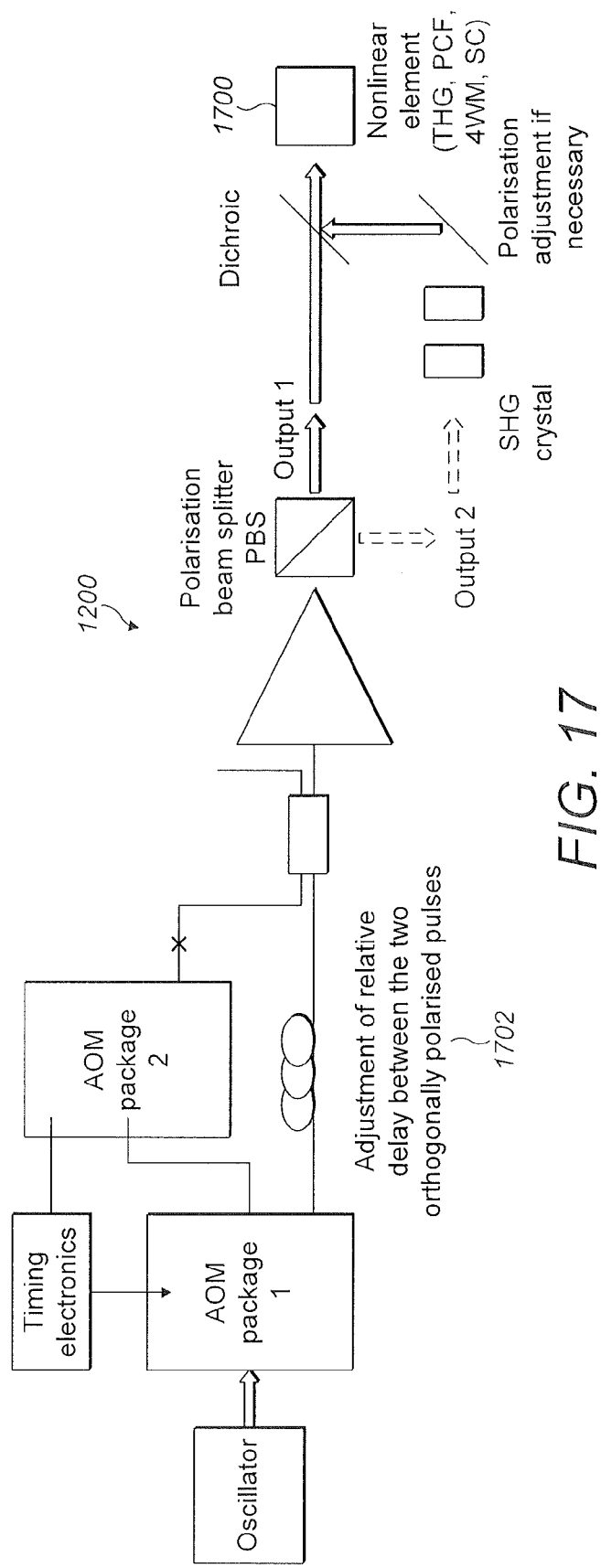
FIG. 17 illustrates a system with combined dual output and ability to adjust separation of pulses, according to an embodiment.

FIG. 17 illustrates an example in which both outputs of the optical system 1200 of FIG. 12 are injected into a nonlinear element 1700. Nonlinear element 1700 may comprise for example a photonic crystal fiber or a nonlinear crystal.

Exemplary configurations include—

-i- Dual wavelength pumping of a nonlinear photonic crystal fiber at 1064 nm and 532 nm to produce improved supercontinuum generation. In this process the Photonic Crystal Fiber can be designed to have a complex dispersion profile with two zero dispersion wavelengths corresponding to the 1064 nm and 532 nm pump sources.

-ii- Third Harmonic generation by synchronous pumping of a nonlinear crystal using in-phase photons at the fundamental and second harmonic wavelengths.

In both of these examples, effects including dispersion and temporal walk off within non-linear crystals and fibers may reduce the overlap of pulses throughout the nonlinear process, which may adversely affect efficiency of the nonlinear process.

However, according to embodiments, a delay element 1702 may be provided to adjust the relative delay between corresponding pulses from outputs 1 and 2, to pre-compensate for dispersion and walk-off and to optimise the conversion process.

According to embodiments, pulses of substantially orthogonal polarisation may be produced from outputs 1 and 2 of the optical system 1200 respectively.

Figure 18:
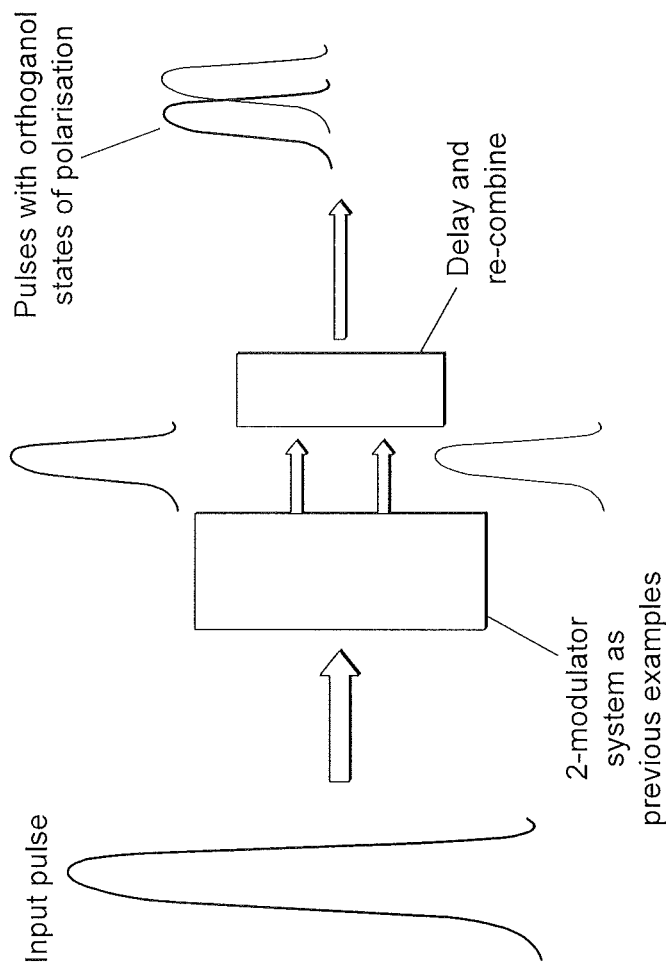
FIG. 18 illustrates, by way of example, using pulse separation in a modulator system to have overlapping or partially overlapping pulses to optimise a nonlinear process, pre-compensating for dispersion and temporal walk off.

See FIG. 18 for an example of using the pulse separation in the modulator system to have overlapping or partially overlapping pulses to optimise the non-linear process, pre-compensating for dispersion and temporal walk off. This approach can produce interleaved pulses with a definable separation of the pulses determined by the required application.

Example 11

In a variation of Example 10, rather than combining the two outputs of the laser system, these outputs can each drive a different nonlinear process. Exemplary nonlinear processes include frequency doubling, trebling, quadrupling, 4 wave mixing and supercontinuum generation. This variation can be applicable for applications in which multiple outputs of lasers are required, with each output having a different wavelength or wavelength range.

In embodiments, two different outputs are delivered from the laser system and, using the modulation capability, one can either have both of these outputs working simultaneously or have fast selection between the two.

Options can include (non-limited) having—
Two different nonlinear PCF's which each produce a different 4WM signal and idler wavelength
Two different nonlinear PCF's which each produce different levels of spectral broadening to cover specific ranges of the spectrum covering the visible and/or Near IR range
A combination of nonlinear PCF at one output and a second, third or fourth harmonic generator from the second output.

Example 12

Figure 19:
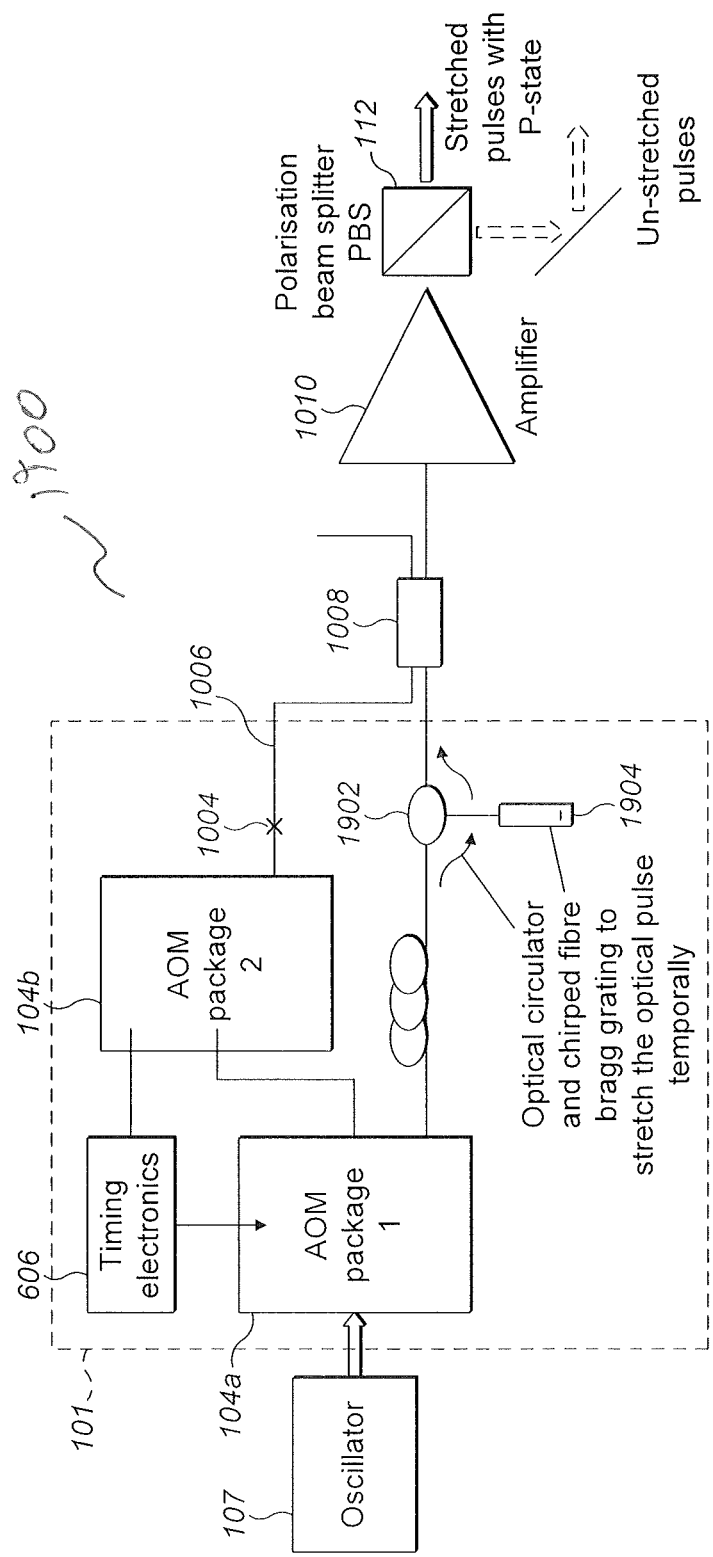
FIG. 19 is an example schematic according to one system design whereby different pulse durations can be delivered by a laser MOPA with fast selection between the two pulses.

FIG. 19 shows another optical system 1900 according to a twelfth example. Optical system 1900 is substantially the same as the system of example 6, but with the following modifications. The same reference numerals are used for corresponding features.

The system 1900 is different to the system 1200 of example 6 in that the optical apparatus 101 includes an additional optical circulator 1902 and chirped fiber Bragg grating (CFBG) 1904 to impart a chirp on the pulse and produce a pulse with a longer or shorter temporal duration. This system therefore combines two pulses within the amplifier 1010 of different time duration but each with their own, substantially orthogonal state of polarisation. Following amplification, the polariser separates the two pulses into two different outputs.

In this way, the pulse duration of the pulses within the modulation system is modified such that the two output pulses with substantially orthogonal states of polarisation have different pulse durations.

The output pulses can be combined using polarisation combination, used to generate their own nonlinear effects or used independently within different applications.

This embodiment may be applicable in a material ablation process, where one wishes to use different pulse durations for different stages of the process, or on different areas of the work piece. This approach and apparatus is a method of achieving this requirement, and also allows this to be achieved both with simultaneous delivery of the pulsed outputs or by switching between the two outputs—something that can be achieved quickly regardless of the output power.

In this system, nonlinear limitations of the amplifier might clamp the maximum peak power delivered by the amplifier, for example stimulated Raman scattering (SRS) within optical fiber amplifiers. In this case it would be beneficial to be able to change the pulse energy of the system when operating with the different pulse durations. For a given amplifier output power, pulses with longer wavelengths can be provided with a higher maximum pulse energy than those of shorter pulses, due to SRS limited peak power within the amplifier.

One potential issue of using polarisation modulation as described within these various examples is that the polarisation extinction can be a factor if one needs to have high extinction between pulses at the MOPA output.

For example, if the amplifier has a polarisation extinction ratio (PER) of only 99%, in each of the timing diagrams shown by way of example, there will be 1% leakage of pulses through the output polariser where pulses were not required.

Figure 20:
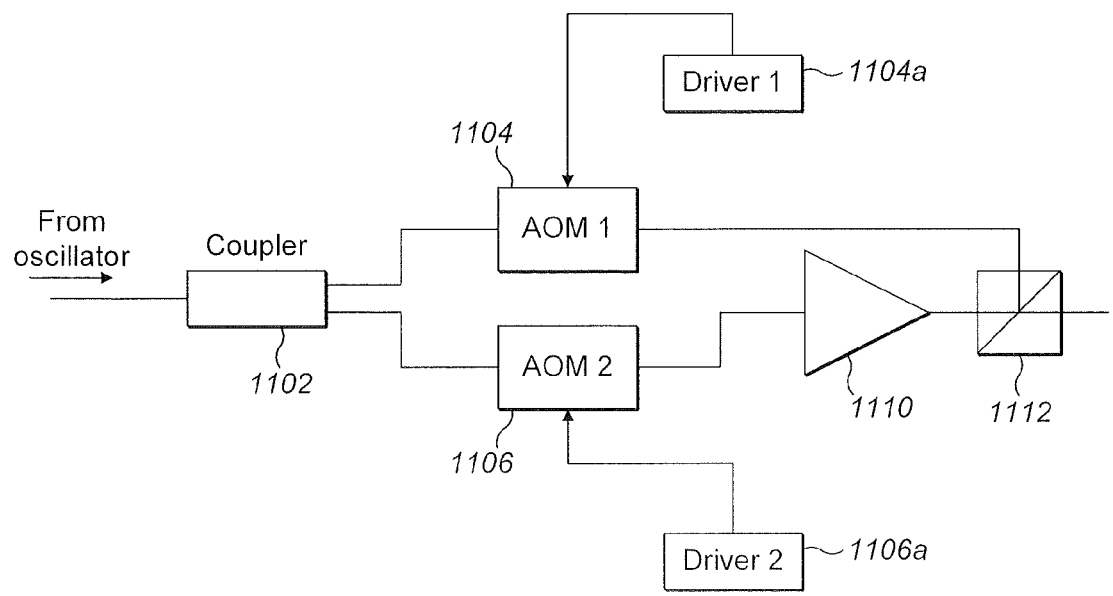
FIG. 20 illustrates an example in which unwanted pulses are injected at an amplifier output.

This problem rises since the two signals of orthogonal state of polarisation propagate in the same direction through the amplifier. This issue can be overcome by the variation of FIG. 11 shown in FIG. 20. As shown, in the example of FIG. 20 the unwanted pulses are injected at the amplifier output.

Example 13

In all previous examples, we describe the use of different states of polarisation as the method of discriminating the two modulated beams after amplification. Use of polarisation as the means for signal discrimination will typically mean that the system use a polarisation maintaining architecture and/or is sensitive to polarisation mode coupling within components and amplifiers such that it is advisable to have high quality optical components and fibers. Also, in between amplifier stages (in a cascaded amplifier design) one will typically avoid polarising optics. Components are best polarisation independent, with minimal polarisation dependent loss.

Other optical parameters may be used to discriminate between modulated signals. Here we describe systems relying on use of different wavelengths to generate signals with different modulation patterns which can be discriminated at any point by using wavelength filtering, for example using a dichroic mirror or wavelength dependent combiners, separators, couplers or switches.

When using polarisation discrimination according to embodiments of the invention, a single oscillator can advantageously be used and the output of this oscillator can be split into the two or more different signal paths, With wavelength discrimination, it is more difficult to have a single oscillator producing more than a single wavelength and therefore in using wavelength discrimination, the use of more than a single oscillator is often preferred. These oscillators can operate as CW, pulsed, modulated, Q-switched, modelocked or a combination of the different laser operating regimes.

By way of example, here we consider an application where one wishes to have a CW MOPA laser system and modulate the output of this MOPA as required by the application. The CW MOPA laser in this example is in the form of a fiber laser and is most likely to be a high power fiber laser for use in industrial manufacturing.

Figure 21:
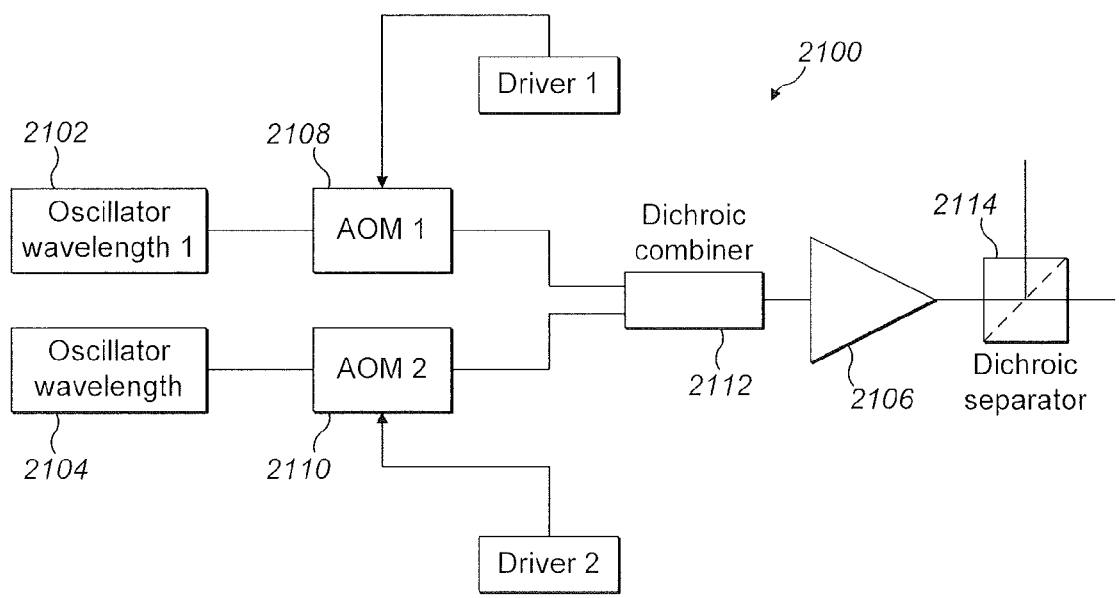
FIG. 21 is a schematic of an exemplary dual wavelength modulated system.

FIG. 21 shows a laser MOPA 2100 whereby two CW laser oscillators 2102, 2104 are provided to seed a high power amplifier 2106 comprising multiple gain stages. The two seed oscillators are made to operate at two different wavelengths selected within the gain bandwidth of the high power amplifier. Preferably the wavelengths are chosen to operate at wavelengths where the amplifier provides similar optical gain, but it might be advantageous to have the seeder wavelengths operate at very different gains. Furthermore, the two wavelengths may be closely spaced by only 1 or a few nanometers, for example. In various practices of the invention, the wavelengths are spaced by at least 5 nm, at least 10 n, at least 15 nm, or at least 25 nm. The two wavelengths can be have a difference of between 1 nm and 5 nm, or between 1 nm and 10 nm, or of between 2 nm and 5 nm or of between 2 nm and 10 nm. The two wavelengths can be spread across the gain bandwidth or even operating at two different short and long wavelength extremes of the amplifier gain bandwidth.

The outputs of the two oscillators 2102, 2104 pass through two different modulators 2108, 2110 (in this example shown as AOMs), whereby the two seeds are modulated as required.

Following modulation, the two seeds are combined using a dichroic filter 2112 into a single seed signal which is injected into the high power amplifier system 2106.

Figure 22:
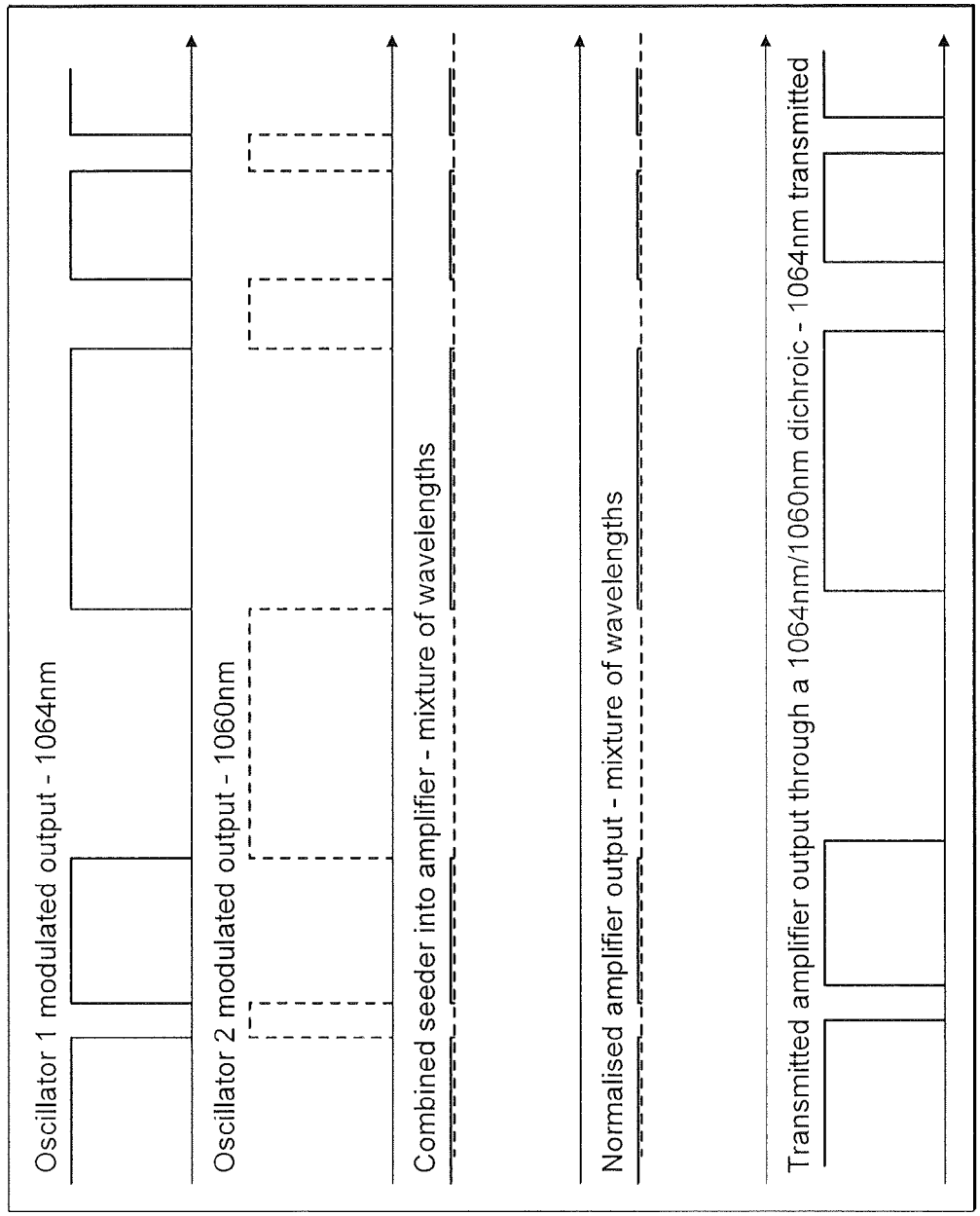
FIG. 22 is an exemplary timing diagram for an exemplary 2-wavelength modulated system.

FIG. 22 shows an example timing diagram showing how such a system works. The end user would have complete control of the desired output modulated signal at a user wavelength (1064 nm or wavelength 2). According to this modulation requirement, the second AOM 2110 is modulated to pass through the desired 1064 nm output. Simultaneously, the first AOM 2108 is modulated in anti-phase to the first AOM 2108, such that the combination of 1064 nm and 1060 nm modulated signals at the input to the high power amplifier, is a constant seed power.

The amplifier is operated continuously at high power. However, after passing through a discrimination device in the form of an output dichroic splitter 2114, only the 1064 nm output is passed to the output of the laser for use by the end user.

This system configuration makes it possible to achieve any modulated output, at very high speeds, whilst ensuring that the amplifier is seeded at an acceptable level.

Clearly the same performance can be achieved using a single laser oscillator configured to provide two different wavelengths rather than having two separate oscillators. In such a configuration, the oscillator output would be wavelength separated, for example using a dichroic splitter, prior to modulation and subsequent re-combination and amplification.

The system in this example would also work if one had two very different oscillator designs and used wavelength (or polarisation) as the optical discrimination means. For example, the first oscillator 2102 might operate at a first wavelength and be continuous wave whereas the second oscillator 2104 may be a nanosecond or modelocked oscillator at a second wavelength (note as in previous examples, wavelength or polarisation can be used but are not limiting examples of parameters).

This particular approach would allow, for example, very fast switching of two different laser outputs, one being CW and the other being pulsed.

Example 14

Use of wavelength discrimination is not limited to CW operation, it can also be used for ultrafast or Q-switched MOPA systems. Here we use an example of a modelocked laser system.

Example 14 comprises two laser oscillators operating at two different wavelengths. The configuration of this example (in the form of a fiber-MOPA) will be described with reference to FIG. 21 as an example of how this system At least one of the oscillators is modelocked or Q-switched and operates with the desired pulse duration and wavelength of the laser system. The other oscillator can also be modelocked or Q-switched (preferably time-synchronised to the first oscillator) but can equally be a CW laser. However, the second oscillator operates at a different wavelength to the first oscillator. Both wavelengths are chosen to fit within the gain bandwidth of the amplifier system (typically a Yb-based system) and preferably at wavelengths where the gain is relatively flat. However, the important point within this system is that the laser amplifier operates well at both of the wavelengths used.

The wavelengths are also preferably chosen such that they are sufficiently separated that nonlinear spectral broadening during amplification do not result in spectral overlap between the two different oscillator pulses and preferably such that dichroics can be used to efficiently combine or separate the two wavelengths.

Each of the oscillators is inputted into a separate modulator 2108, 2110 (in this example we show AOMs). The outputs of the two AOMs are combined using a dichroic filter combiner 2112 into a single seed signal, injected into a high power amplifier system. Following amplification, the wavelength signals are separated in a discriminatinon device comprising a dichroic splitter 2114, or an alternative means such as a Volume Bragg Grating for example.

The output modulation signals previously described by way of the example of using polarisation modulation can also be attained through wavelength discrimination and modulation.

Example 15

One specific embodiment of the invention is an ultrafast laser system which delivers high power, high pulse energy output with a user-defined modulation pattern and at 1030 nm wavelength.

The MOPA itself is based around an Ytterbium doped fiber system, where the oscillator and amplifier stages all have gain within the Yb-fiber gain bandwidth.

In ultrafast amplifiers, the length of the fiber amplifier is typically made to be as short as possible in order to minimise optical nonlinear effects due to propagation of highly intense pulses within the fiber. In such Yb-doped amplifiers, typically the peak gain of the system operates in the region around 1030 nm but extends from 1020 nm to beyond 1080 nm.

In this example, referring to FIG. 21, the first oscillator 2102 can be a modelocked fiber oscillator operating at 1030 nm and, for example, 20 MHz pulse repetition rate. The second oscillator 2104 can comprise a cw laser or a modelocked oscillator operating at a different wavelength within the Yb-fiber gain bandwidth. In this embodiment, the second oscillator 2104 is a modelocked fiber oscillator operating at a pulse repetition rate of 80 MHz. The oscillator having the wavelength to be discriminated out from the desired wavelength (1030 nm) so as to be separated from the 1030 nm has a higher repetition rate.

The objective of this system is to be able to provide 1030 nm pulses on demand, and this is achieved by modulating the first AOM 2108 accordingly.

In its simplest form, AOM1 2108 and AOM2 2110 are operated in anti-phase such that, when a 1030 nm pulse is required, AOM1 2108 is open and AOM2 2110 is closed but when zero 1030 nm laser output is required, AOM1 2108 is closed and AOM2 2110 is opened. In this case, since the second oscillator 2104 operates at 80 MHz and the first oscillator 2102 at 20 MHz, synchronization is not performed.

In actual fact, since the amplifier has wavelength dependent gain, optical components within the amplifier will have wavelength dependent loss and the oscillators will most likely deliver different powers, it is important to operate AOM2 2110 and AOM1 2108 with different transmission (achieved with driving the two AOMs with different RF power levels). In this case, it will be necessary to have different seed levels into the amplifier depending on the mix of 1030 nm light and 1064 nm light signals.

The outputs from the two AOMs are combined using a wavelength dependent combiner (shown in FIG. 21 as a dichroic combiner), and this combined, time-wavelength modulated signal propagates to the high power amplifier.

Following amplification, the beam passes through a wavelength discrimination device 2114 (e.g: a dichroic mirror) which passes the 1030 nm output to the laser output aperture for use by the end user and delivers the unwanted 1064 nm light to be either "dumped" or used in another application if required.

In specific embodiments of the invention, the main goal is to aim to have a relatively constant seed power at the input to the amplifier such that the amplifier can operate at high power and/or high gain regardless of the desired modulation duty cycle of the oscillator signal of interest.

Use of wavelength discrimination has certain benefits over polarisation, since there is little interdependence of the two signals as a result of polarisation extinction ratio of the amplifier system. This approach can work in a polarisation maintaining or non-polarisation maintaining MOPA architecture.

Example 16

Figure 23:
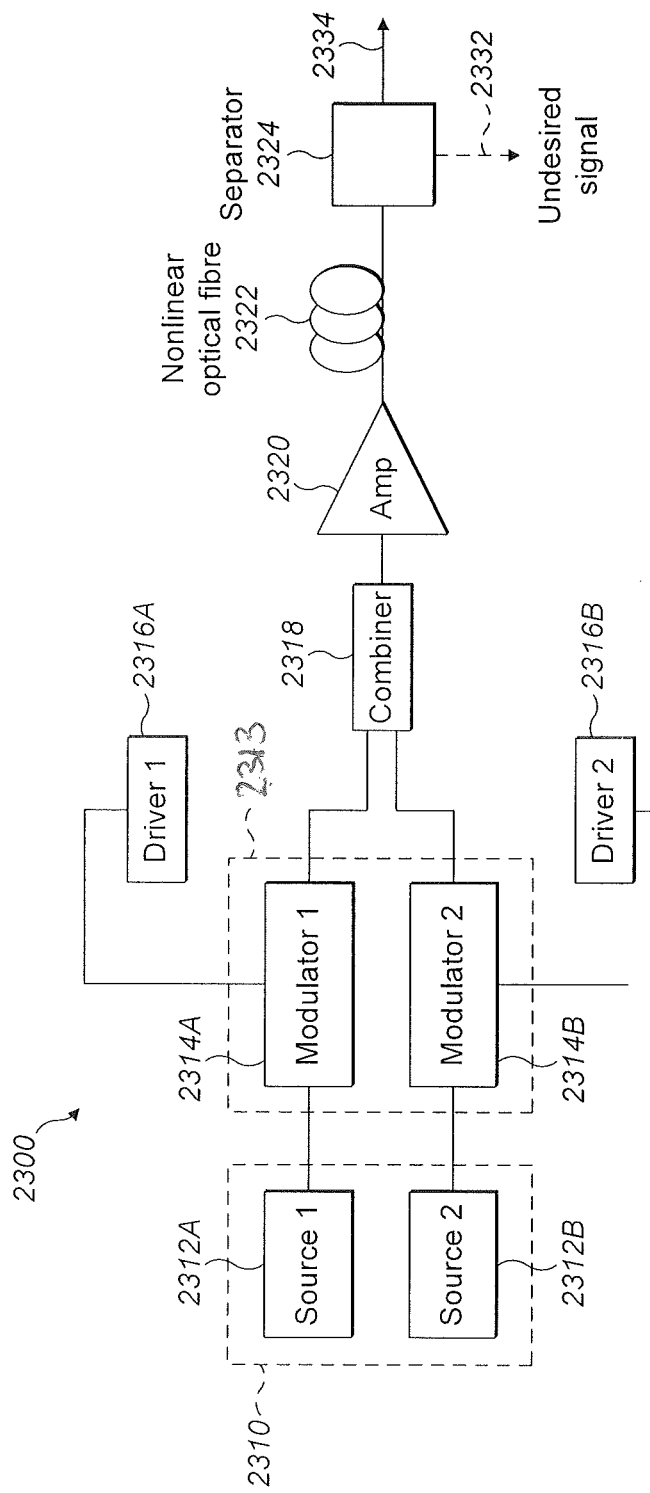
FIG. 23 shows an apparatus for use with a sixteenth example of the invention.

Example 16 can use signal discrimination to achieve high speed nonlinearly produced pulses on demand, from single shot to several tens of MHz repetition rates. The signal discrimination can be wavelength based and/or based on differences in an optical response of the optical system to different signals. With reference to FIG. 23, the system 2300 can include a source apparatus 2310 that can include a first source 2312A and a second source 2312B. The modulation apparatus 2313 may comprise a first modulator 2314A to modulate the first source and a second modulator 2314B to modulate the second source 2312B. The modulators 2314A and 2314B can, for example, comprise AOMs.

The combiner 2318 can combine signals from the modulators 2314A and 2314B, and the amplifier 2320 downstream of the combiner is followed by a nonlinear element 2324. A discrimination device in the form of a separator 2324, downstream of the nonlinear optical element 2322, separates out a desired signal 2334, which proceed to an output, from an undesired signal 2332. In some practices, the "undesired" signal is simply provided with the desired signal to an output. In this practice the separator need not be used.

The first source 2312A can comprise a modelocked oscillator operating at 40 MHz, producing pulses of approximately 10 picoseconds temporal duration and at a wavelength of 1064 nm and the second source 2312B can comprise a continuous wave oscillator operating at a wavelength of 1030 nm.

Preferably the nonlinear process of the nonlinear element comprises supercontinuum generation within a photonic crystal fiber or fibers. Accordingly, the non-linear element 2322 shown in FIG. 23 can comprise a photonic crystal fiber configured for producing a supercontinuum.

As one of ordinary skill will appreciate, based on consideration of this disclosure, the system 2300 of FIG. 23 can, in the practices of the invention under discussion in this Example 16, operate in a similar manner to that of Example 15.

The first and second modulators 2314A and 2314B, respectively, can be driven substantially out of phase (e.g., when one modulator transmits a substantial optical signal the other does not and vice versa). This can be done, in one practice of the disclosure, such that the input signal to the amplifier following the combiner 2318 of FIG. 23, is maintained at a selected power level, which limits energy storage (e.g., at relatively constant level), which is preferably selected such that the amplifier can be continuously pumped at a high power level without risk of self-Q-switching.

In certain practices of the invention disclosed herein, the overlap of one of the signals relative to the other of the signals within the nonlinear element (such as by viewing propagation of the signals along the nonlinear element at a moment frozen time) can be 0%, no greater than 5%, no greater than 10%, no greater than 15%, no greater than 20%, no greater than 25%, or no greater than 35%.

It is also within the scope of the invention as disclosed herein that source 2 simply provide a substantially unmodulated signal to the combiner 2318. For example source 2 can provide a cw signal that is combined and amplified and provided to the nonlinear element 2322, such as without passing through a modulator. This example also provides an opportunity for a discussion of "overlap". In this instance the cw signal would overlap a pulsed signal from modulator 1 completely (e.g., 100%) but the modulated signal from modulator 1 would typically overlap the cw signal by a much smaller percentage because of the modulation, such as with the bounds noted above for the overlap.

The system 2300 can produce supercontinuum (spectrally broadened) light when high power pulses (pulses from the first source 2312A, amplified in the amplifier 2320, are injected into the nonlinear fiber of the nonlinear optical element 2322. If modulator 1 is permanently open, the amplifier is seeded with 40 MHz pulses. The system 2300 is preferably configured such that the amplifier 2320 is pumped at a sufficient level (provides enough gain) to pump the nonlinear element 2322 so as to generate spectrally broadened (supercontinuum) output from the nonlinear element 2322.

When modulator 1 is open, the amplifier 2320 is seeded with pulses from source 1, at 40 MHz. In this example, the amplifier 2320 amplifies the pulses to an average power of up to 20 Watts, a pulse energy of 500 nanoJoules, and a peak power of 50 kilowatts. After the nonlinear fiber of the nonlinear element 2322, there is a broadband supercontinuum output, which can have, for example, an average power of approximately 10 Watts, at 40 MHz (250 nanoJoules) with spectrum spanning from the blue (450 nm) to the near infrared (beyond 2000 nm).

The amplifier 2320 can be configured to be pumped at relatively constant power and deliver a relatively constant output power of approximately 20 Watts.

At any point in time, modulator 1 2314A can driven so as to modulate, preferably driven synchronised with the repetition rate of source 1, to change the number of 1064 nm pulses passing through the modulator 1 2314A into the amplifier 2320. The modulator can "pulse pick" to provide any desired selection of pulses.

As noted above modulator 2 2314B is typically configured to operate out of phase with modulator 1 2314A such that, when modulator 1 is closed, reducing the number of pulses (and hence the 1064 nm average seed power) entering the amplifier, modulator 2 2314B is open, allowing 1030 nm cw light to seed the amplifier 2320.

The power of source 2 2312B and the operation of modulator 2 2314B can be arranged such that the amplifier seed (e.g., the average input seed power from the 1030 and 1064 nm light) over time is predictable and optimised to enable consistent gain of the pulses within the amplifier, to a pulse energy of 500 nanojoules. However, more generally it is just desired to have some seed to the amplifier in between the pulses of the 1064 nm light so as to reduce the risk of damaging or otherwise undesired behaviour (e.g., self q-switching).

The amplified output of the amplifier 2320 becomes a series of 500 nJoule, 50 KW peak power pulses at 1064 nm and a high power 1030 nm CW output (albeit modulated in an "on" or "off" fashion if modulator 2312B is included).

When injected into the nonlinear fiber comprised by the nonlinear element 2322 the pulses can, for example, generate 250 nanoJoules of pulsed supercontinuum energy, spanning from 450 nm to beyond 2 um, with a high power background cw wavelength at 1030 nm. Other bandwidths are possible as well, as one of ordinary skill in the art understands.

If modulator 1 2314A is closed completely, then the nonlinear fiber output will be purely CW 1030 nm light at high power.

The system 2300 can optionally include a discrimination device such as for example in the form of a separator 2324, which can be located downstream of the non-linear element 2322, as shown in FIG. 23, for separating out an undesired part 2332 of the signal traversing the nonlinear element 2322 from a desired portion that can be output as the output signal 2334.

In one practice of the invention, such as where source 1 and source 2 providing signals having different wavelengths, the separator 2324 can comprise a reflective dichroic (which can be narrowband at 1030 nm) that is placed in the supercontinuum output beam filter out the cw 1030 nm light. The separator could alternatively be placed before the nonlinear element, such that the 1030 nm light does not reach the nonlinear element. The separator can include a simple blocking filter that includes a stopband for the 1030 nm light.

Although systems that rely on either the wavelength or state of polarisation to differentiate between signals are described above, other optical parameters, or combinations of other optical parameters, could alternatively be exploited in order to achieve the objective of embodiments of this invention.

For example, the separator may comprise a saturable absorber or other device, such as a nonlinear device, that can distinguish signals based on optical power, as the spectrally broadened light will typically have higher peak power and can be passed to the output whereas the other signal does not have such peak power or does not substantially contribute to the spectrally broadening process and is of much lower power and can be absorbed or otherwise treated differently by the saturable absorber or nonlinear device of the separator 2324.

However, placing the separator 2324 downstream of the nonlinear element 2322 can be particularly advantageous in the practice of the disclosure wherein the non-linear element comprises a microstructured fiber or PCF or other optical fiber as it allows the output fiber of the amplifier 2320 to be spliced directly to the microstructured fiber comprised by the nonlinear element 2322. A practical supercontinuum fiber laser typically includes a length of nonlinear fiber within a housing that can also include one or more (such as all) of a source, such as one of the sources 2312A and 2312B, one or more modulators, such as one or more of the modulators 2314A and 2314B, one or more combiners (e.g., combiner 2318), and one or more amplifiers (e.g., fiber amplifier 2320). As noted above, the housing can also include a nonlinear element, such as a length of microstructured that receives pump energy and provides spectral broadening responsive to receiving the pump energy, and a length of delivery fiber extending out of the housing. The length of delivery fiber extends outside of the housing and is often terminated by a beam delivery module, which can comprise a casing or other housing in which the beam delivery fiber terminates. The beam delivery module can also include a collimating lens or output window for providing environmental protection for the end of the delivery fiber.

In one embodiment of the disclosure, the beam delivery module can also comprise the separator 2324, which, for example, can comprises a filter or dichroic that attenuates or blocks an undesired wavelength or wavelength band, such as by directing such wavelengths out of the beam delivery module. This can differ from merely filtering out unused pump in that the signal attenuated or blocked (attenuated means attenuated relative to becoming part of output signal, which can include redirecting as well as attenuating without redirecting) often has not contributed substantially to the spectral broadening or other nonlinear processes or process of interest in producing the output light. The signal being attenuated could, in many practices of the disclosure, been attenuated upstream of the nonlinear element rather than downstream without a substantially different effect on the output signal.

Part or substantially all of the length of the delivery fiber between a housing and the beam delivery module can be configured to behave nonlinearly so as to participate in the nonlinear process of interest, such as by, for example, provide spectral broadening responsive to propagation of signal therealong.

Note that in an interesting variation of Example 16 source 1 2312A and source 2 2312B can comprise substantially the same center (i.e., fundamental) wavelength. One of the sources can be a cw source that is modulated by one of the modulators and the other source can be a pulse source, such as, for example, a picosecond pulse source, that is modulated by the other of the modulators to "pulse pick" selected pulses. This approach has benefits in that, as compared to using sources having different center wavelengths, the can be less of a need to balance any wavelength dependent gain in the amplifier 2320 or, as another example, less of a need to operate the amplifier 2320 such that it efficiently amplifies different wavelengths.

In a preferred practice the amplifier 2320 can more readily be seeded at substantially the same power level, regardless of the particular pulse picking of the pulsed laser source (e.g., source 1), by adjusting the powers of the sources (and/or of any attenuation of the modulators 1 and 2) and driving modulators 1 and 2 such that they modulate substantially out of phase, as noted above. Again, however, the more general goal is to avoid undesirable consequences or effects, and this does not necessarily require substantially constant average input power to the amplifier 2320.

In an exemplary configuration, the signal from source 2 2312B is such that the signal after amplification does not cause any substantial non linear effect when the amplified signal of source 2 is provided to the nonlinear element (e.g: photonic crystal fiber). In particular, the amplified second signal does not generate a supercontinuum. On the other hand, after amplification, the pulses from source 1 cause supercontinuum generation in the nonlinear element. Due to the spectral broadening of the signal from source 1, a spectral difference is introduced between the signals from source 1 and source 2, which is sufficient for the signals to be separated downstream by a wavelength-dependent discriminator 2324.

In a specific example, source 1 2312A may comprise a 1064 nm, 20 MHz pulsed laser producing 5 ps pulses at an average energy of about 5 mw and source 2 2312B may comprise a 1064 nm substantially cw source (or high rep rate or long pulse source). In this example, the cw signal from source 2 2312B is such that the peak power after amplification is not sufficient to cause any substantial nonlinear effect when the amplified signal of source 2 is provided to the nonlinear element 2322. In particular, the power is insufficient to generate a supercontinuum. However, in this example, the amplifier outputs the signal from source 1 as pulses having 400 nj of energy at an average power of 8 Watts, which is sufficient to cause supercontinuum generation in the nonlinear element, thereby introducing a spectral difference between the signals from source 1 and source 2, which is sufficient for the signals to be separated by a suitable discriminator 2324.

However, more generally speaking, there may be any useable difference between the response of system 2300 such that any undesired signal can be separated and treated differently. It is possible the source 2 could provide a signal that after amplification does trigger a nonlinear effect. There just needs to be some optical difference between signals provided by the sources 1 and 2 at some point during their traverse of the system 2300 or on the effect they have on the system that allows selective removal from the final output of undesired signal components.

The separator can remove the 1064 nm light of the amplified signal of source 2 by comprising a notch filter or a narrowband dichroic. Of course the spectrally broadened output signal 2334 will also have 1064 nm removed as well, though usually this is not a problem in many applications. In applications where only visible (or near infrared) wavelengths are needed, then the separator 2324 can include an appropriate bandpass filter with a cutoff that also rejects the 1064 nm light.

Note that although two sources and two modulators are shown in FIG. 23, one of ordinary skill in the art, cognizant of the disclosure herein, understands that in the broad sense the system 2300 of FIG. 23 can be considered to comprise a laser source apparatus 2340 that includes at least one laser source. For example, where the signals combined by the combiner comprise substantially the same wavelength, the laser source apparatus could, in certain practices of the disclosure, comprise a laser source and an optical splitter (with perhaps a attenuator for attenuating one of the split signals relative to the other) for providing first and second optical signals to modulators 1 and 2 respectively. Similarly, the system 2300 can be considered to include a modulation apparatus 2313 that can include at least one modulator. For example, the modulation apparatus 2313 can comprise an AOM having two outputs, such as is disclosed above, which case one of the modulators can comprise the AOM with two outputs and the other modulator is not required.

The techniques described herein are not limited to the generation of a supercontinuum but can be used with other non-linear effects that are, for example, predominantly driven by four wave mixing or frequency doubling.

This configuration enables supercontinuum pulses on demand, whilst enabling an all-fiber (spliced) supercontinuum source, whereby the amplifier output fiber can be spliced directly to the nonlinear fiber, without the need for any intermediary bulk components, which cause attenuation and potential failure points due to free-space launching of high power light into the optical fiber core.

Many of the examples above consider a pulsed laser system and pulse picking modulation as the form of modulation of the pulsed laser output. However, according to embodiment the similar configurations can be used to modulate CW sources or even a combination of CW and pulsed lasers to provide a multi-functional hybrid laser system.

The invention can for example, in one or more of its various aspects:

Enable fast modulation at very high power, which in many instances cannot be achieved with commercially available optical modulator technology;

Provide a means for ensuring that an optical amplifier can be seeded at a constant level and operate at a constant gain yet achieve fast modulation with low duty cycle without issues relating to noise generation due to fluctuating gain requirements;

Enable fast modulation lasers without the need for external free-space optical modulators which typically affect beam quality and beam pointing stability;

Provide a solution for switching between 2 beam paths in a laser, for example in switching between fundamental and second harmonic. This can be achieved with no moving parts and with MHz switching speed; and Provide a means for producing several novel apparatus capable of exploiting multiple output beams with different parameters and allowing either combination of these outputs with variable temporal delay and/or fast selection between the two outputs without any need for moving parts;

Make use of nonlinear effects as described herein.

The invention has several and varied aspects, including, alone or in combination, providing methods and apparatus for (i) modulating with high speed (>200 nanoseconds), high power (e.g., >1 Watt, >10 Watts, >50 Watts) laser systems, such as MOPA systems; modulating high repetition rate (>1 MHz, >5 MHz, >50 MHz, high power (e.g., as noted above, >1 Watt, >10 Watts, >50 Watts) pulsed lasers systems, such as a MOPA system; and (iii) switching a laser beam between two different steered paths, with a reduced need for, or even elimination of, mechanically or electrically moving mirrors, which often have the drawbacks of hysteresis and/or lack of beam position consistency.

The present disclosure is directed to each individual feature, system, material and/or method described herein. In addition, any combination of two or more such features, systems, materials and/or methods, if such features, systems, materials and/or methods are not mutually inconsistent, is included within the scope of the present invention. For example, any arrangement/method disclosed for providing two signals may be used with any disclosed method/arrangement for downstream use of the signals, e.g: non-linear generation. Moreover, in any of the foregoing embodiments, signal discrimination can be provided before or after nonlinear generation, or forgone. Moreoever, methods of the invention are deemed to include the functional steps shown for operation of apparatus. Those skilled in the art would readily appreciate that all parameters, dimensions, materials and configurations described herein are meant to be exemplary and that in certain practices of the invention actual parameters, dimensions, materials and configurations can depend on specific applications for which the teaching of the present disclosure is used. Accordingly, one of ordinary skill understands that the invention may be practiced otherwise than as specifically described and remain within the scope of the appended claims and equivalents thereto.

In the claims as well as in the specification above all transitional phrases such as "comprising," "including," "carrying," "having," "containing," "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03.

The phrase "A or B" as in "one of A or B" is generally meant to express the inclusive "or" function, meaning that all three of the possibilities of A, B or both A and B are included, unless the context clearly indicates that the exclusive "or" is appropriate (i.e., A and B are mutually exclusive and cannot be present at the same time). "At least one of A, B or C" (as well as "at least one of A, B and C") reads on any combination of one or more of A, B and C, including, for example the following: A; B; C; A & B; A & C; B & C; A & B; as well as on A, B & C.

It is generally well accepted in patent law that "a" means "at least one" or "one or more." Nevertheless, there are occasionally holdings to the contrary. For clarity, as used herein "a" and the like mean "at least one" or "one or more." The phrase "at least one" may at times be explicitly used to emphasize this point. Use of the phrase "at least one" in one claim recitation is not to be taken to mean that the absence of such a term in another recitation (e.g., simply using "a") is somehow more limiting. Furthermore, later reference to the term "at least one" as in "said at least one" should not be taken to introduce additional limitations absent express recitation of such limitations. For example, recitation that an apparatus includes "at least one widget" and subsequent recitation that "said at least one widget is coloured red" does not mean that the claim requires all widgets of an apparatus that has more than one widget to be red. The claim shall read on an apparatus having one or more widgets provided simply that at least one of the widgets is coloured red. Similarly, the recitation that "each of a plurality" of widgets is coloured red shall also not mean that all widgets of an apparatus that has more than two red widgets must be red; plurality means two or more and the limitation reads on two or more widgets being red, regardless of whether a third is included that is not red, absent more limiting explicit language (e.g., a recitation to the effect that each and every widget of a plurality of widgets is red).

The invention claimed is:

1. A supercontinuum optical source, comprising:
    a laser source apparatus comprising at least one laser, said laser source apparatus configured for providing first and second signals;
    a modulator apparatus downstream of at least one laser of the laser source apparatus for modulating at least one of the first and second signals;
    an amplifier downstream of the modulator apparatus, said supercontinuum optical source configured such that the amplifier amplifies the first and second signals;
    a nonlinear optical element in optical communication with and downstream of both the modulator apparatus and the amplifier for providing selected spectral broadening responsive to the first signal, said supercontinuum optical source configured such that said nonlinear optical element receives the second signal as well as the first signal;
    a length of delivery fiber in optical communication with said nonlinear optical element, said length of delivery fiber having at one end a beam delivery module for providing an output beam from the supercontinuum optical source; and
    wherein said beam delivery module comprises a discrimination device for removing at least part of the second signal or at least part of any signal generated nonlinearly by the nonlinear optical element responsive to the second signal from the supercontinuum optical source output beam.

2. A supercontinuum optical source, comprising:
    a laser source apparatus comprising at least one laser, said laser source apparatus configured for providing first and second signals;
    a modulator apparatus downstream of at least one laser of the laser source apparatus for modulating at least one of the first and second signals, said modulator apparatus including at least one modulator;
    a combiner downstream of the modulator apparatus for combining the first and second signals;
    an amplifier downstream of the combiner for amplifying the first and second signals after combination;
    a nonlinear optical element downstream of the amplifier for receiving the first and second signals after amplification, the nonlinear optical element providing spectral broadening responsive to the first signal and wherein the second signal does not substantially contribute to spectral broadening; and
    an output for outputting spectrally broadened light from the supercontinuum optical source.

3. The supercontinuum optical source of claim 2 wherein the first and second signals comprise the same center wavelength.

4. The supercontinuum optical source of claim 2 wherein the first and second signals comprise substantially the same polarization.

5. The supercontinuum optical source of claim 2 comprising a discrimination device for removing at least part of the second signal from the spectrally broadened light output from the output.

6. The supercontinuum optical source of claim 2 wherein the optical source is configured such that the first and second signals are provided to the amplifier so as to be substantially out of phase with each other.

7. The supercontinuum optical source of claim 1 wherein said discrimination device discriminates on the basis of wavelength.

8. The supercontinuum optical source of claim 1 wherein said discrimination device comprises a polarization sensitive optical element.

9. A supercontinuum optical source, comprising:
    A first laser for providing a first signal, said first laser comprising a modelocked laser;
    a second laser for providing a second signal;
    a modulator apparatus comprising a first modulator, the first modulator located downstream of the first laser for modulating the first signal;
    a combiner downstream of the first modulator for combining the first and second signals;
    an amplifier downstream of the combiner for amplifying the first and second signals after combination;
    a nonlinear optical element downstream of the amplifier for receiving the first and second signals after amplification, the nonlinear optical element providing spectral broadening responsive to the first signal and wherein the second signal does not substantially contribute to spectral broadening;
    an output for outputting spectrally broadened light from the supercontinuum optical source; and
    wherein the optical supercontinuum source is configured such that first and second signals are provided to the amplifier so as to be substantially out of phase with each other.

10. The supercontinuum optical source of claim 9 comprising a discrimination device for removing at least part of the second signal from the spectrally broadened light output from the output.

11. The supercontinuum optical source of claim 9 wherein said nonlinear optical element comprises a photonic crystal fiber.

12. The supercontinuum optical source of claim 11 wherein said amplifier comprises an output optical fiber and wherein said output optical fiber of said amplifier is spliced directly to said photonic crystal fiber.

13. The supercontinuum optical source of claim 1 wherein said nonlinear optical element comprises a photonic crystal fiber.

14. The supercontinuum optical source of claim 13 wherein said amplifier comprises an output optical fiber and wherein said output optical fiber is spliced directly to said photonic crystal fiber.

15. The supercontinuum optical source of claim 5 wherein said discrimination device discriminates on the basis of wavelength.

16. The supercontinuum optical source of claim 5 wherein said discrimination device comprises a polarization sensitive optical element.

17. The supercontinuum optical source of claim 5 wherein said nonlinear optical element comprises a photonic crystal fiber.

18. The supercontinuum optical source of claim 2 wherein said amplifier comprises an output optical fiber and wherein said output optical fiber is spliced directly to said photonic crystal fiber.

* * * * *